(12) United States Patent
Buschmann et al.

(10) Patent No.: US 8,318,972 B2
(45) Date of Patent: Nov. 27, 2012

(54) PRODUCTION OF PEROXYCARBOXYLIC ACIDS

(75) Inventors: Wayne E. Buschmann, Boulder, CO (US); Andrew S. Del Negro, Broomfield, CO (US)

(73) Assignee: Eltron Research & Development Inc., Boulder, CO (US)

( * ) Notice: Subject to any disclaimer, the term of this patent is extended or adjusted under 35 U.S.C. 154(b) by 571 days.

(21) Appl. No.: 12/407,397

(22) Filed: Mar. 19, 2009

(65) Prior Publication Data
US 2009/0314652 A1 Dec. 24, 2009

Related U.S. Application Data

(60) Provisional application No. 61/037,821, filed on Mar. 19, 2008.

(51) Int. Cl.
C07C 409/24 (2006.01)
C25B 3/00 (2006.01)
C25B 1/28 (2006.01)

(52) U.S. Cl. ............ 562/2; 205/439; 205/440; 205/465; 205/466

(58) Field of Classification Search ...... 562/2; 205/466, 205/439, 465, 440
See application file for complete search history.

(56) References Cited

U.S. PATENT DOCUMENTS

| | | |
|---|---|---|
| 5,122,538 A | 6/1992 | Lokkesmoe et al. |
| 5,244,547 A | 9/1993 | Clifford et al. |
| 5,505,740 A | 4/1996 | Kong et al. |
| 5,632,676 A | 5/1997 | Kurschner et al. |
| 5,702,585 A * | 12/1997 | Hillrichs et al. ............ 205/468 |
| 5,792,315 A | 8/1998 | Landfors et al. |
| 6,008,405 A | 12/1999 | Gray et al. |
| 6,224,744 B1 | 5/2001 | Gimenez et al. |
| 6,387,238 B1 * | 5/2002 | Merk et al. .................... 205/439 |
| 6,514,509 B2 | 2/2003 | Tabasso |
| 6,547,947 B1 | 4/2003 | Uno et al. |
| 6,566,574 B1 | 5/2003 | Tadros et al. |
| 6,569,286 B1 | 5/2003 | Withenshaw et al. |
| 6,723,890 B2 | 4/2004 | Tucker et al. |
| 6,949,178 B2 * | 9/2005 | Tennakoon et al. .......... 205/439 |
| 7,012,154 B2 | 3/2006 | Vineyard et al. |
| 7,235,252 B2 | 6/2007 | Preto et al. |
| 7,271,137 B2 | 9/2007 | Tucker et al. |
| 7,754,064 B2 | 7/2010 | Buschmann |

(Continued)

FOREIGN PATENT DOCUMENTS
EP 1 469 102 10/2004
(Continued)

OTHER PUBLICATIONS

Sudoh et al., "Production of Hydrogen Peroxide in Acidic Solutions by Electrodialysis of Peroxide Ions Generated by Electroreduction of Oxygen in Alkaline Solutions", J. of Chem. Eng. of Japan (no month, 1991), vol. 24, No. 4, pp. 465-771. Abstract Only.*

(Continued)

*Primary Examiner* — Edna Wong
(74) *Attorney, Agent, or Firm* — Greenlee Sullivan P.C.

(57) ABSTRACT

Provided are various methods, systems and reactors for producing peroxycarboxylic acid compositions, such as non-equilibrium compositions of peracetic acid, for example. The methods and systems relate to electrolytic generation of hydrogen peroxide or peroxide ions in a reactor, wherein the generated materials are reacted with an acetyl donor to form peracetic acid. In an embodiment, a source of alkali metal ions is provided to an anode chamber such that the ratio of concentrations of the alkali metal ions to protons in the anode chamber of a reactor is greater than 1.

25 Claims, 8 Drawing Sheets

U.S. PATENT DOCUMENTS

| | | |
|---|---|---|
| 2002/0004057 A1 | 1/2002 | Tabasso |
| 2007/0074975 A1 | 4/2007 | Buschmann et al. |
| 2007/0184155 A1 | 8/2007 | Harvey et al. |
| 2009/0175956 A1 | 7/2009 | Buschmann et al. |

FOREIGN PATENT DOCUMENTS

| | | | |
|---|---|---|---|
| GB | 1 456 592 | | 11/1976 |
| JP | 11189889 A | * | 7/1999 |
| JP | 2001122601 A | * | 5/2001 |
| WO | WO 00/19006 | | 4/2000 |
| WO | WO 01/10215 | | 2/2001 |

OTHER PUBLICATIONS

Hoffmann et al. (1992) "Bleaching Activators and the Mechanism of Bleaching Activation," *J. für Praktische Chemie/ Chemiker-Zeitung* 334(4):293-297.

Kuehn et al. (May 1983) "The Electrolytic Synthesis of Hydrogen Peroxide in a Dual Membrane Cell," *J. Electrochem. Soc.* 130(5):1117-1119.

Saha et al. (2004) "Electrolytic Synthesis of Peroxyacetic Acid Using In Situ Generated Hydrogen Peroxide on Gas Diffusion Electrodes," *J. Electrochem. Soc.* 151(9):D93-D97.

Swern, D. (1970) "Organic Peroxy Acids—Preparation, Properties, and Structure," In; *Organic Peroxides,* vol. 1, Ch. 6, Wiley-Interscience, New York.

Swern, D. (1970) "Methods of Preparation and Analysis of Organic Peroxyacids," In; *Organic Peroxides,* vol. 1, Ch. 7, Wiley-Interscience, New York.

International Search Report and Written Opinion, Corresponding to International Application No. PCT/US09/37651, Mailed Dec. 15, 2009.

* cited by examiner

PRODUCTION OF PEROXYCARBOXYLIC ACIDS

CROSS-REFERENCE TO RELATED APPLICATIONS

This application claims the benefit of U.S. provisional application 61/037,821 filed Mar. 19, 2008, which is incorporated by reference in its entirety herein to the extent not inconsistent with the disclosure herein.

BACKGROUND OF THE INVENTION

Rapid, on-site production of peracetic acid (PAA) from safe, non-hazardous feedstocks is an enabling technology for facilities and applications where bulk storage and handling of hazardous materials is not permissible or where the consumption time exceeds the shelf life of bulk peracetic acid. Small quantity users of peracetic acid will especially benefit from on-site generation due to the impracticalities (hazardous and unstable) of distributing small quantities of peracetic acid.

Various methods for on-site peracetic acid production are known in the art. Disadvantages of such known methods are, among others, (1) the long reaction or cure times required to produce equilibrium concentrations of peracetic acid solutions; (2) costs of shipping, handling, and storage, (3) limited shelf life of concentrated acids, bases, and peroxides, which are all corrosives and hazardous materials; (4) cost of shipping large quantities of water containing merchant hydrogen peroxide; (5) the presence of stabilizers or contaminants originating from merchant hydrogen peroxide; (6) relatively low production rates or excessive equipment size and cost associated with direct electrochemical production of peracetic acid with gas diffusion electrode reactor technologies; (7) inability to recycle supporting electrolyte salts back into the production process. In addition, the practice of combining bulk chemical constituents obtained from merchant suppliers to produce non-equilibrium peroxycarboxylic acid solutions, including peracetic acid is incapable of producing the compositions provided herein. Processes and related devices provided herein eliminate these disadvantages and other disadvantages associated with shipping, storing and handling concentrated merchant peracetic acid.

U.S. Pat. Nos. 6,566,574, 6,723,890 and 7,271,137 all relate to compositions for neutralization or decontamination of chemical or biological toxins prepared by chemical mixing of various components including a reactive compound which can be hydrogen peroxide. U.S. Pat. No. 6,723,890 relates to an aqueous decontamination formulation comprising: a cationic surfactant; a cationic hydrotrope; certain reactive compounds (including hydrogen peroxide); a fatty alcohol having a concentration from greater than 1 wt. % to 2 wt %; and water. U.S. Pat. No. 7,271,137 relates to an aqueous decontamination formulation for use in disinfection and sterilization, consisting of (by weight percentage): 0.5-60% reactive compound selected from the group consisting of nucleophilic compounds and oxidizing compounds, which can be hydrogen peroxide; 1-10% water-soluble bleaching activator which can be monoacetin, diacetin, or triacetin, among other acetyl compounds, and; 3-30% of inorganic base which can comprise potassium acetate.

U.S. Pat. No. 7,235,252, Preto et al. relates to a system for rapid preparation, just before use, of organic peroxyacids, in a hydroalcoholic environment, by mixing separately stored first and second reactants, where the first reactant includes an acyl donating group and the second reactant is in the solid state and comprises a peroxide anion source, a biocidal agent including at least one linear or branched aliphatic and/or aromatic alcohol, and a stabilizing buffer component suitable for keeping the second reactant at a desired pH value.

U.S. Pat. No. 5,505,740 (Kong et. al) describes a method for in-situ formation of peroxyacid using peroxyacid precursor, a source of hydrogen peroxide and a source for delayed release of acid for a bleaching product (wash solution) and a method of removing soil from fabrics. In the method of Kong et al. the aqueous wash solution is initially raised to a relatively high pH level (e.g., 9.5) to enhance production of the peroxyacid in the aqueous solution, followed by lowering the pH of the aqueous solution by, for example, the delayed release of acid, to enhance bleach performance. The source of the delayed release of acid may be an acid of delayed solubility, an acid coated with a low solubility agent or an acid generating species, or an acid independent of the bleaching product employed.

U.S. Pat. No. 5,122,538, Lokkesmoe et al, (Ecolab) relates to a process to generate peroxy acid sanitizing and bleaching compositions at the point-of-use. The process comprising introducing hydrogen peroxide and a carboxylic acid into a reactor and contacting the hydrogen peroxide and carboxylic acid in the presence of a sulfonic acid resin and in the substantial absence of active metal ions to form an aqueous peroxy acid composition at concentrations up to 20 wt %.

British Pat. Pub. No. GB 1,456,592 relates to a bleaching composition having both encapsulated bleaching granules and agglomerated pH-adjustment granules acid. The bleaching granules comprise an organic peroxy acid compound stabilized by salt(s) of strong acids and water of hydration, encapsulated in a fatty alcohol coating. The pH-adjustment granules comprise a water-soluble alkaline buffer yielding pH 7-9 agglomerated with a suitable adhesive material to yield the desired solubility delay. Preferred peroxyacid compounds are diperisophthalic acid, diperazelaic acid, diperadipic acid, monoperoxyisophthalic acid, monosodium salt of diperoxyterephthalic acid, 4-chlorodiperoxyphthalic acid, p-nitroperoxy benzoic acid, and m-chloroperoxy benzoic acid.

U.S. Pat. No. 6,569,286 and published PCT No. WO0019006 (App. No. WO1999 GB03178) relate to a process for bleaching of wood and non-wood pulp. In this process an agglomerate containing, among others, a bleach activator (e.g., tetraacetylethylenediamine, TAED) and a peroxide soluble binder (e.g., polyvinyl alcohol) is added to a dilute solution of hydrogen peroxide. The components are allowed to react and the pH of the resulting mixture is chemically adjusted to a suitable alkaline pH and the pulp is contacted with the resulting solution. The patent notes the use of an ion-selective barrier or membrane between the anodic and cathodic chambers of the electrolysis unit of FIG. 1 therein. The barrier between the anodic and cathodic chambers in the device of FIG. 1 is described as "a cation exchange membrane, which permits migration of protons ($H^+$) between the two chambers," and as a separation between electrolytes in the two chambers.

The above processes differ from the processes provided herein, at least in part, in that they are all based on mixing chemical precursors with no electrochemical production or electrochemical pH adjustment components.

Peracids can be produced in electrochemical cells or reactors by establishing a potential difference across electrodes immersed in electrically-conducting fluid and introducing appropriate reactant materials. For example, U.S. Pat. No. 6,387,238 (Merk et al.) (corresponding to WO 01/10215 or JP-T-2003-506120) relates to a method for preparing an antimicrobial solution containing peracetic acid in which hydrogen peroxide or peroxide ions are formed electrolytically and the hydrogen peroxide or peroxide ions are then reacted with an acetyl donor to form peracetic acid.

U.S. Pat. No. 6,949,178 (Tennakoon et al.) discloses a process and apparatus for the preparation of peroxyacetic acid at the cathode of an electrolytic cell having an ionically conducting membrane in intimate contact between an anode and a gas diffusion cathode. The method comprises supplying an aqueous organic acid solution to the anode, supplying a source of oxygen to the cathode, and generating peroxyacid at the cathode.

European Patent EP1469102 (Ohsaka et al.) relates to a process and apparatus for electrolytically producing peracetic acid from acetic acid or acetate and an oxygen-containing gas using an electrolytic cell incorporating a gas diffusion electrode in the presence of a solid acid catalyst.

U.S. provisional application 61/019,825, filed Jan. 8, 2008 and U.S. application Ser. No. 12/350,866, filed Jan. 8, 2009 relate to frozen non-equilibrium peroxycarboxylic acid compositions useful as antimicrobial ice.

SUMMARY OF THE INVENTION

The invention provides improved methods of production of peroxycarboxylic acids and peroxycarboxylic acid containing solutions for various applications that utilize non-equilibrium peroxycarboxylic acids. The invention also provides improved compositions comprising peroxycarboxylic acids made by the methods herein.

In an embodiment, various processes for producing peroxycarboxylic acids, such as peracetic acid are provided. The production is particularly useful for on-site production of peracetic acid. Additionally, the peroxycarboxylic acid solutions produced, including peracetic acid solutions, have non-equilibrium compositions, such as characterized by high peroxycarboxylic acid (POA) and water to carboxylic acid (CA) and hydrogen peroxide ($H_2O_2$) ratios. In an aspect, the ratio of $[POA][H_2O]/[CA][H_2O_2]$ is $\geq 10$, $\geq 100$, $\geq 1000$, $\geq 10,000$. In another aspect the ratio of $[POA][H_2O_2]$ is: $\geq 1$, $\geq 5$, $\geq 10$, $\geq 100$, when the [POA][CA] concentration ratio is $\geq 1$.

More specifically, peracetic acid solutions of this invention have non-equilibrium compositions such as characterized by high peracetic acid (PAA) and water ($H_2O$) to acetic acid (AA) and hydrogen peroxide ($H_2O_2$) ratios. In an aspect, the ratio of $[PAA][H_2O]/[AA][H_2O_2]$ is $\geq 10$, $\geq 100$, $\geq 1000$, $\geq 10,000$. In another aspect the ratio of $[PAA][H_2O_2]$ is: $\geq 1$, $\geq 5$, $\geq 10$, $\geq 100$ when the [PAA][AA] concentration ratio is $\geq 1$. The non-equilibrium PAA solutions are economically competitive to equilibrium peracetic acid solutions commercially produced ("merchant") and having typically maximum weight peracetic acid content of between 5% and 35%, where $[PAA][H_2O]/[AA][H_2O_2]$ ratios are typically between 1.8 and 2.5.

A particular advantage of the use of non-equilibrium peroxycarboxylic acid is that solutions having concentrations of less than about 10 g/L peroxycarboxylic acid can be produced economically. This is particularly the case with non-equilibrium PAA. For example, making dilute solutions (<10 g/L) of equilibrium PAA is not cost-effective because in dilute solutions equilibrium favors the formation of hydrogen peroxide and acetic acid over PAA requiring high ratios of feed chemicals to obtain the desired PAA product at low concentration. Therefore, the cost of feed chemicals is much lower for non-equilibrium PAA relative to equilibrium PAA at low concentrations of PAA. Another advantage of non-equilibrium peroxycarboxylic acid is that the feed chemicals (hydrogen peroxide and acyl donor (or acetyl donor)) are significantly less hazardous than those of high concentration equilibrium solutions. This results in safer storage and handling for the end user.

In an aspect, processes disclosed herein utilize an electrochemical reactor that produces electrolytic hydrogen peroxide ($H_2O_2$) and/or peroxycarboxylic acid solutions of controlled pH and composition. Typical $H_2O_2$ concentrations of use in the process examples and made by various reactor systems include, but are not limited to, from 0.01% up to 0.1% (1000 mg/L), or from 0.01% up to 0.5% (5000 mg/L), or from 0.01% up to 5% (50,000 mg/L). Electrolytically produced peroxide solution is reacted with an acyl or acetyl donor to generate peroxycarboxylic acid. In an embodiment, the generated peroxycarboxylic acid is peracetic acid.

In an aspect, various processes are provided for producing peroxycarboxylic acids such as 2-hydroxyperbenzoic acid (peroxysalicylic acid) and other substituted derivatives of peroxybenzoic acids. The production is particularly useful for on-site production of peroxybenzoic acids. Additionally, produced peroxybenzoic acid solutions have non-equilibrium compositions such as characterized by high peroxybenzoic acid (PBA) and water ($H_2O$) to benzoic acid (BA) and hydrogen peroxide ($H_2O_2$) ratios. In an aspect, the ratio of $[PBA][H_2O]/[BA][H_2O_2]$ is $\geq 10$, $\geq 100$, $\geq 1000$, $\geq 10,000$, thus making them economically competitive to commercial peroxybenzoic acid sources, while eliminating the hazards and costs of shipping and storing organic peroxides such as peroxybenzoic acids. In specific embodiments, solutions of peroxycarboxylic acids of this invention are solutions in water. In other specific embodiments, solutions of peroxycarboxylic acids are solutions in aqueous solvents which are mixtures of water and a water miscible organic solvent, such as a lower alcohol, and in particular ethanol. In an aspect, processes disclosed herein utilize an electrochemical reactor that produces electrolytic hydrogen peroxide ($H_2O_2$) solutions of controlled pH and composition. Typical $H_2O_2$ concentrations of use in the process examples and made by various reactor systems include, but are not limited to, from 0.01% up to 0.1% (1000 mg/L), or from 0.01% up to 0.5% (5000 mg/L), or from 0.01% up to 5% (50,000 mg/L). Electrolytically produced peroxide solution is reacted with an acyl donor, such as 2-hydroxybenzoic acid ethyl ester (salicylic acid ethyl ester, ethyl salicylate), to generate peroxybenzoic acids. In an embodiment, the generated peroxycarboxylic acid is peroxysalicylic acid.

In an aspect, the acyl or acetyl donor is not in contact with an electrode of the reactor. Instead, the donor is placed in a chamber that does not contain an electrode. Examples of such chambers include, but are not limited to, a chamber that is external to the reactor and a chamber that is internal to the reactor, but is not in direct fluid contact with the electrodes. In this aspect, "not in direct fluid contact" refers to membranes that separate the central chamber from each of the cathode and anode chambers so that the central chamber contains "post-processed" peroxycarboxylic acid product. Such systems provide a number of benefits, such as not electrolyzing the acyl or acetyl donor, POA or PAA product or $H_2O_2$ to inactive forms, improved process monitoring and process control, thereby achieving higher yields and reliability compared to conventional electrochemical POA (particularly PAA) production. Additional advantages include, but are not limited to, preserving the as-formed $[POA]:[H_2O_2]$ ratio, access to the acyl or acetyl donor(s), POA or PAA components and mixture for monitoring and replenishing as necessary, and ability to reliably control end product characteristics.

In an aspect, the acyl or acetyl donor is not in contact with a cathode of the reactor. For example, the donor is placed in a chamber that contains an anode. Such a system provides the benefits of not electrolyzing the POA or PAA product to inactive forms, improved process monitoring and process control, thereby achieving higher yields and reliability compared to conventional electrochemical POA or PAA production. Additional advantages include, but are not limited to, increasing the [POA][$H_2O_2$] ratio, reducing concentration of acyl or acetyl donor byproduct, and ability to reliably control end product characteristics.

The peracid production rate and yield amount depends on the reactor system and operating conditions including, but not limited to, concentration of reactants, temperature, pH, reactor materials such as membranes, electrodes, operating voltage, electrolyte composition and concentration, added chemical stabilizers, flow-rates, delivery rate and mechanism of supply of oxygen-containing gas, etc. The process may be operated in batch mode. The process may be operated in continuous mode. The process may be semi-batch or semi-continuous mode. Generated peroxycarboxylic acid-containing solutions are pH adjusted by either chemical and/or electrolytic methods, the latter allowing electrolyte ions to be recovered back into the electrolytic peroxide production process, thereby facilitating continuous or semi-continuous operating modes. The pH adjustment may be automatic or semi-automated such as by feedback control and flowloops where caustic flow-stream output may be at least partially introduced into a feedstock stream.

The peroxycarboxylic acid product solution produced by any of these processes can be formed very rapidly and on-demand with non-equilibrium compositions making it more convenient, efficient, and cost effective while being safer to handle at relatively low (point of use) concentrations compared to concentrated peroxycarboxylic acid products having equilibrium compositions.

In an embodiment, the processes and device systems for performing the processes provide one or more of: (1) Electrochemical production of a caustic hydrogen peroxide solution where the solution pH, concentration of peroxide, and ratio of hydroxide to peroxide are controlled by the electrolytic reactor process by flowstream manipulation, residence time, mixing methods, ion selection and concentration, and other parameter control as known in the art; (2) Reaction of the electrolytic caustic hydrogen peroxide solution with an acyl or acetyl donor to rapidly produce non-equilibrium peroxycarboxylic acid solutions that may optionally include additional additives (such as electrolytes, stabilizers, buffers, alcohols, etc.); (3) The pH of the resulting peroxycarboxylic acid solution, particularly peracetic acid, may optionally be adjusted to lower pH (including, but not limited to pH$\leq$7, pH$\leq$6, or 1.5$\leq$pH$\leq$4.5) by either a chemical means of mixing acid with the solutions or electrolytically adjusting the pH in the same apparatus used to produce the electrolytic caustic hydrogen peroxide solution (e.g., and optionally a combination of the two pH adjustment methods); (4) Recovery of electrolyte cations liberated during pH adjustment of the peroxycarboxylic acid solutions for recycle of electrolyte cations back into the electrolytic caustic hydrogen peroxide production process; (5) Feedstocks for this process are electricity, an oxygen-containing gas, water, an electrolyte salt, and an acyl or acetyl donor.

There are a large number of known acyl or acetyl donors including, but not limited to, diacetin, triacetin, acetylsalicylic acid, tetraacetylethylenediamine. In an aspect, the acyl donor is not a carboxylic acid, but instead is a donor that provides for a non-reversible chemical reaction with hydrogen peroxide to form the corresponding peroxycarboxylic acid. In a more specific aspect, the acetyl donor is not acetic acid, but instead is a donor that provides for a non-reversible chemical reaction with hydrogen peroxide to form peracetic acid. The reaction between the acetyl donor and hydrogen peroxide is accelerated at alkaline pH, and in some embodiments, preferably between 10$\leq$pH$\leq$13. The acetyl donor or mixture of donors may be in liquid or solid form or dissolved in a solvent when reacted with a solution of hydrogen peroxide, preferably at alkaline pH, to form peracetic acid. The resulting peracetic acid product may then be used as made or its pH adjusted to a desirable level. Additionally, a peroxide stabilizer may be added before, during, or after combination of the acetyl donor with hydrogen peroxide.

In an embodiment, the electrochemically produced caustic hydrogen peroxide solution is chemically reacted with an acyl or acetyl donor (and other additives if desired). Next, the pH of the resulting peroxycarboxylic acid solution is adjusted electrolytically and/or chemically if desired (for product stabilization or pH requirements of the end use application). During the electrolytic product pH adjustment process or after chemical pH adjustment, the cations liberated by neutralization of caustic are electrolytically separated and recovered back into the electrochemical caustic hydrogen peroxide production process. This electrolytic recycling of cations reduces or eliminates the need for additional electrolyte salt feedstock. The operating conditions of the electrochemical process are also adjusted to optimize the caustic hydrogen peroxide solution pH and hydroxide to peroxide ratio prior to reaction with the acyl or acetyl donor, whereby the chemical reaction rate and yield of peroxycarboxylic acid is maximized. Depending on the specific reactor and system, parameters of interest include return flow-rates of feedback loops, residence time in mixing or reactor chambers, electrolyte concentrations, any one or more feedstock parameters or compositions, including electrolytes, stabilizers, co-solvents, pH adjusters, pH buffers.

In another embodiment, sequential physical mixing of bulk chemicals is used to generate peroxycarboxylic acid in situ. This alternative physical mixing approach includes the steps of (1) mixing a base with hydrogen peroxide to produce a caustic peroxide solution; (2) mixing the caustic peroxide solution with an acyl donor (e.g. an acetyl donor) to produce a non-equilibrium peroxycarboxylic acid solution; (3) adjusting the pH of the resulting peroxycarboxylic acid solution with acid (for product stabilization or pH requirements of the end use application). The required feedstocks for this process in an automated system are electricity, water, merchant hydrogen peroxide, base (such as sodium or potassium hydroxide or acetate), acyl donors (e.g., acetyl donors), and acid (such as sulfuric or acetic acid).

In an embodiment, the invention is an electrolytic reactor for carrying out any of the processes disclosed herein. Depending on the particular process, the reactor may be a two-chamber or a three-chamber reactor. In an aspect, a mixing chamber is integrated within the reactor for mixing an acyl donor (e.g., an acetyl donor) with a caustic hydrogen peroxide solution, wherein the chamber is electrically isolated from the cathode and anode. In an aspect, the reactor and process provides PAA production without a need for distillation. As required, various flowloops for introducing feedstock, feedback lines for pH control, and output lines for collecting POA (e.g., PAA) product solution are incorporated.

In another embodiment, provided is a method for making a peroxycarboxylic acid composition by electrolytically generating alkaline hydrogen peroxide or peroxide ions in a reactor comprising a cathode chamber having a cathode, an anode chamber having an anode and at least one cation exchange membrane separating said chambers. A source of alkali metal ions is provided to the anode chamber such that the ratio of concentrations of alkali metal ions to protons formed in the anode chamber is greater than 1 and the predominant cations transported through the at least one cation exchange membrane are alkali metal ions. Hydrogen peroxide or peroxide ions are reacted with an acetyl donor to form peracetic acid in a mixing chamber that is electrically isolated from the anode and cathode of the reactor to produce the peroxycarboxylic acid composition comprising alkali metal ions.

In an aspect, the source of alkali metal ions is a salt added to said anode chamber, or is the peroxycarboxylic acid composition formed in the method, wherein at least a portion of the composition is recycled to the anode chamber.

In another aspect, any of the methods provided herein relate to the source of alkali metal ions being added directly to the anode chamber.

In an embodiment, any of the methods provided herein use a two chamber reactor, such as an anode chamber and a cathode chamber. In an embodiment, any of the methods provided herein use a reactor comprising a central chamber between the anode and cathode chambers and separated from each of the chambers by at least one cation exchange membrane and the source of alkali metal ions is added to the anode chamber, the central chamber or both. Optionally, the alkaline hydrogen peroxide or peroxide ions has a pH greater than or equal to 10 and less than or equal to 13.

Any of the methods provided herein optionally have an alkaline hydrogen peroxide or peroxide ions with a pH greater than or equal to 10 and less than or equal to 13.

In another aspect, any of the methods provided herein relate to a reacting step that further comprises introducing one or more acetyl donors to the mixing chamber; and introducing the electrolytically generated alkaline hydrogen peroxide or peroxide ions from a cathode chamber of the reactor to the mixing chamber, thereby generating the peracetic acid composition. Any of the methods provided herein further comprise introducing to the reactor a peroxide stabilizer, an electrolyte salt or both. In an aspect, any of the methods provided herein relate to a peroxycarboxylic acid composition formed having a pH that is less than or equal to 8.

Further provided are methods related to specific ratio of concentrations, such as molar ratios, of alkali metal ions to protons formed in the anode chamber. In an aspect, provided are ratios in the anode chamber that are greater than or equal to 3; between about 3 and 4, inclusive; and greater than or equal to 10, for example.

In another embodiment, any of the methods provided herein further comprise introducing the peroxycarboxylic acid composition from the mixing chamber to the reactor, adjusting the pH of the peroxycarboxylic acid composition by electrodialysis, and removing the peroxycarboxylic acid composition from the reactor to obtain a peroxycarboxylic acid product solution, wherein the peroxycarboxylic acid product solution has a pH that is less than or equal 8, and optionally wherein the ratio of concentrations of alkali metal ions to protons formed in the anode chamber is greater than or equal to 3, or greater than or equal to 10.

Also provided are methods for making a peroxycarboxylic acid composition by electrolytically generating hydrogen peroxide or peroxide ions in an electrochemical reactor having an anode chamber having an anode and a cathode chamber having a cathode and at least one cation exchange membrane separating the anode and cathode chambers. Hydrogen peroxide or peroxide ions are reacted with an acyl or acetyl donor to form peroxycarboxylic acid, wherein the peroxycarboxylic acid is formed in a mixing chamber that is electrically isolated from the anode and cathode. A salt is introduced into the reactor and an alkaline electrolyte solution produced by electrodialysis of the salt is introduced to the reactor. The alkaline caustic electrolyte solution adjusts the pH of the hydrogen peroxide or peroxide ions to a pH that is greater than or equal to 9.5 and less than or equal to 13.

In an aspect, the method further comprises adding a source of alkali metal cations to an anode chamber of the reactor. In an embodiment of this aspect, the ratio of concentrations of alkali metal ions to protons in the anode chamber is greater than or equal to 1; greater than or equal to 3, greater than or equal to 3 and less than or equal to 4; or greater than or equal to 10.

In another aspect, the reactor has a catholyte solution containing the generated hydrogen peroxide or peroxide ions, and the method further comprises, controlling the reactor catholyte pH, wherein the catholyte pH is greater than or equal to 10 and less than or equal to 13; and/or controlling a peroxide to hydroxide ratio in the catholyte solution, wherein the ratio is greater than or equal to 0.5:1 and less than or equal to 5:1 or between about 0.5:1 and 2:1. Optionally, the controlling steps comprise balancing transfer rates of alkali metal cations and acid protons introduced to the catholyte solution.

In an aspect, the ratio of concentrations of alkali metal ions to protons formed in the anode chamber is greater than 1, the alkaline hydrogen peroxide or peroxide ions has a pH greater than or equal to 10 and less than or equal to 13, and the peroxycarboxylic acid composition has a pH less than or equal to 8.

In another aspect, the peroxycarboxylic acid composition is introduced to an anode chamber of the reactor, thereby lowering said peracetic acid composition pH by electrodialysis and lowering the hydrogen peroxide concentration.

Any of the methods provided herein further comprise introducing at least a portion of the peroxycarboxylic acid composition from the anode chamber to the mixing chamber by an acidic anolyte loop, thereby providing additional pH regulation of the peroxycarboxylic acid composition.

In an aspect, any of the methods relate to a peroxycarboxylic acid that is peracetic acid. In another aspect, any of the methods relate to a peroxycarboxylic acid that is a substituted derivative of peroxybenzoic acid. In another aspect, any of the methods are for making a peroxycarboxylic acid that is a non-equilibrium composition.

Also provided is an electrochemical reactor for generating peroxycarboxylic acid compositions, comprising an anode positioned within an anode chamber; a cathode positioned within a cathode chamber for producing alkaline hydrogen peroxide catholyte solution; at least one cation exchange membrane separating the anode and cathode chambers; an optional central chamber between the cathode and anode chambers and separated from each of the chambers by at least one cation exchange membrane; a mixing chamber electrically isolated from the anode and cathode for receiving an acyl donor; a mixing chamber conduit for supplying a caustic catholyte solution to the mixing chamber; a peroxycarboxylic acid (POA) composition conduit for introducing POA made in the mixing chamber to the reactor, wherein the POA composition conduit is operably connected to the anode chamber or the optional central chamber; and a reactor outlet for removing from the reactor at least a portion of the POA formed in the reactor. In an embodiment, the removed POA is in a solution of lower pH than the POA made in the mixing chamber In an aspect, the reactor further comprises an acidic anolyte loop that operably connects the reactor outlet to the POA composition conduit, thereby providing rapid pH adjustment to the POA made in said mixing chamber. In another aspect, the mixing chamber is positioned either external to the reactor or internal to the reactor.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

DETAILED DESCRIPTION OF THE INVENTION

Figure 1:
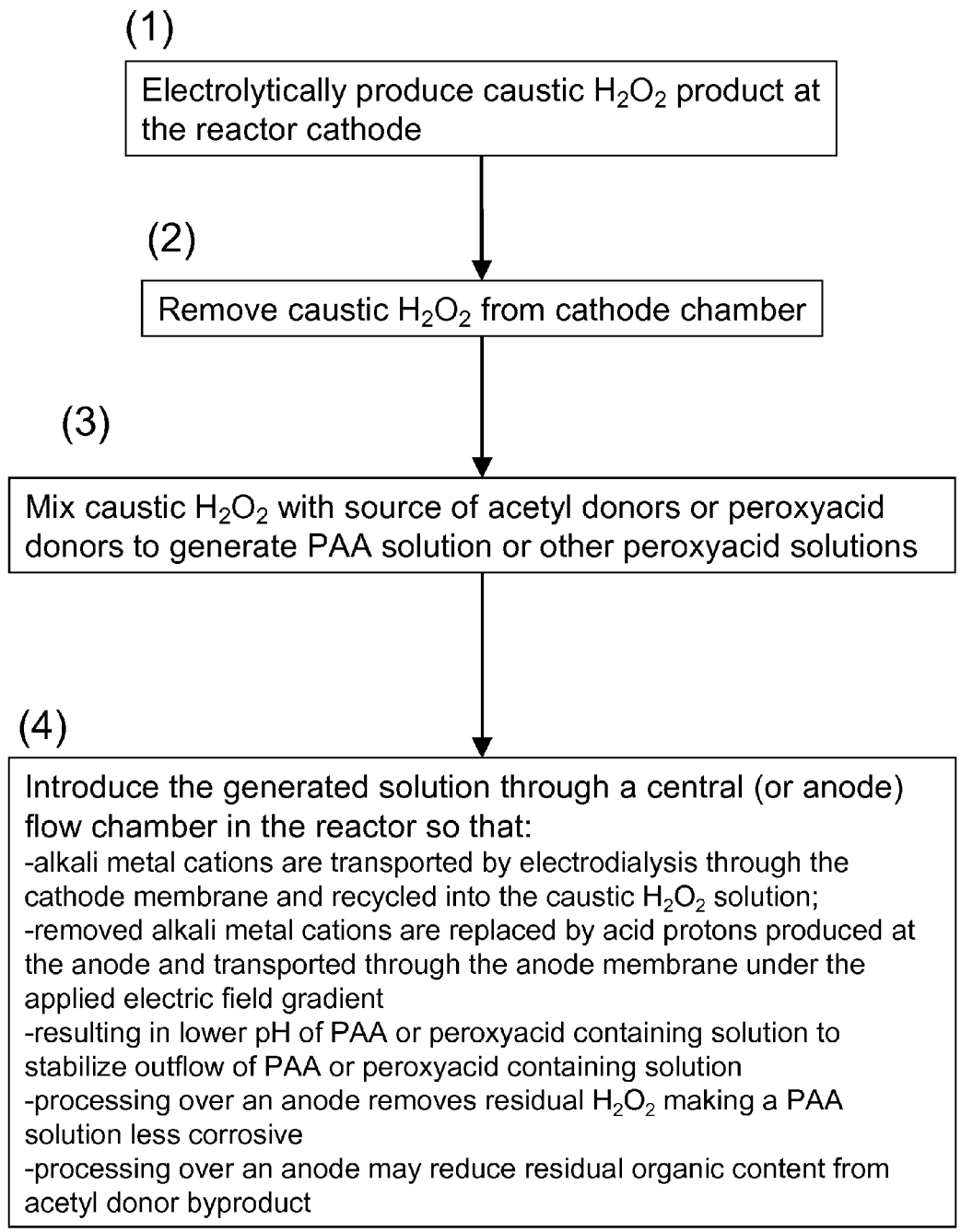
FIG. 1 is a flow-chart summary of one embodiment of a PAA-producing process, where produced PAA is fed into the reactor, such as into a central chamber (for a three-chamber reactor) or anode chamber (for a two-chamber reactor).

"Acyl donor" refers to a material which supplies an acyl donor for reacting with the hydrogen peroxide or peroxide ions to form a solution which includes a peroxycarboxylic acid. In a specific embodiment, an "acyl donor" refers to a material which supplies an acetyl donor for reacting with the hydrogen peroxide or peroxide ions to form a solution which includes peracetic acid.

"Acetyl donor" refers to a material which supplies an acetyl donor for reacting with the hydrogen peroxide or peroxide ions to form a solution which includes peracetic acid. The composition of the acetyl donor source for use in a commercial reactor system may be composed of an acetyl donor compound, optionally containing more than one type of acetyl donor compound, optionally containing an electrolyte salt, optionally containing a peroxide stabilizer, optionally containing a base, optionally containing an acid, optionally containing a solvent (water, alcohols, organic). Examples of acetyl donors include, but are not limited to O-acetyl donors (—O—C(O)CH$_3$), such as acetin, diacetin, triacetin, acetylsalicylic acid, (β)-D-glucose pentaacetate, cellulose (mono and tri)acetate, D-mannitol hexaacetate, sucrose octaacetate, and acetic anhydride. N-acetyl donors (—N—C(O)CH$_3$) may also be used, such as N,N,N'N'-tetraacetylethylenediamine (TAED), N-acetyl glycine, N-acetyl-DL-methionine, 6-acetamidohexanoic acid, N-acetyl-L-cysteine, 4-acetamidophenol, and N-acetyl-L-glutamine. Examples of acyl donors "Peroxycarboxylic acids" (POA, also referred to in the art as peracids, peroxyacids, or percarboxylic acids) include, but are not limited to, peracetic acid (peroxyacetic acid), peroxybenzoic acid (perbenzoic acid) and substituted forms of peroxybenzoic acid; di-peroxymalonic acid, di-peroxysuccinic acid, di-peroxyglutaric acid, di-peroxyadipic acid; all isomeric forms of each of peroxypropionic acid, peroxybutanoic acid, peroxyhexanoic acid, peroxydodecanoic acid, and peroxylactic acid; and peroxycarboxylic acid derivatives of amides, carbohydrates, saccharides, polysaccharides, cellulose, fatty acids and surfactants. Peroxyacetic acid (PAA) is a representative peroxycarboxylic acid (POA). Methods and compositions herein which are exemplified with PAA can be practiced in general with any one or more peroxycarboxylic acids (POA).

"POA composition" or more specifically "PAA composition" refers to the POA, or more specifically the PAA, made and released from the mixing chamber. "POA product solution" or more specifically "PAA product solution" refers to POA, or more specifically PAA, removed from the reactor, such as a POA or PAA composition that has been introduced to the reactor. In an embodiment, the POA product solution has a pH that is lower than the POA composition that is introduced to the reactor. In an aspect the POA product solution, specifically the PAA product solution has a pH$\leq$8, pH$\leq$7, pH$\leq$6, or 1.5$\leq$pH$\leq$4.5.

"Reactor" refers to an electrolytic chamber that uses electricity, water and oxygen to generate a reactant such as hydrogen peroxide for producing PAA. Suitable reactors are known in the art (see, e.g., U.S. Pat. Nos. 6,387,238, 6,949,178; U.S. Pub. No. 2007/0074975, each of which are hereby incorporated by reference, such as for reactor design and materials) and are disclosed herein. Some common features of such reactors are outlined in FIGS. 3-6 and include electrodes and electrode-containing chambers, membranes, inputs for reactants, and a power supply.

"Not in contact" refers to a reactant material that is placed in a chamber that is isolated from the electrode (cathode and anode) chambers, such as a mixing chamber. In processes disclosed herein, this refers to acetyl donors in a mixing chamber that is physically separated from the electrode chambers.

"Caustic" refers to basic pH solutions. In an aspect the pH is greater than about 9, greater than 10, or greater than and equal to 10 and less than and equal to 13. In an aspect, the hydrogen peroxide-containing catholyte solution is caustic, such as pH$\geq$9, pH$\geq$10, or 9.5$\leq$pH$\leq$13 and is introduced to the acetyl donor containing source to generate PAA.

"Equilibrium" and "non-equilibrium". "Equilibrium PAA" is most commonly produced by mixing hydrogen peroxide, acetic acid, water and an acid catalyst. The mixture is allowed to "cure" for several days at which time the mixture reaches steady state equilibrium.

In aqueous solution peracetic acid is in a chemical equilibrium with acetic acid, hydrogen peroxide and water. This equilibrium is represented in the following Equation (1):

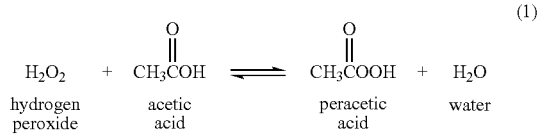

For example, a higher concentration of reactants is required to produce a higher concentration of peracetic acid. Conversely, a higher concentration of water will drive the reaction backwards, which means dilute solutions have very low peracetic acid equilibrium concentrations and mostly contain water and unused starting materials.

The molar concentration ratio of products versus reactants gives an equilibrium ratio often referred to as the equilibrium constant as shown in the following Equation (2A):

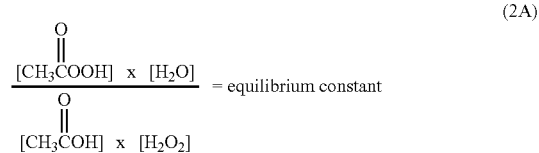

For equilibrium peracetic acid solutions this equilibrium constant typically ranges between 1.8 and 2.5. [See "Organic Peroxides," Daniel Swern, Editor; Wiley-Interscience, New York, 1970-72 (3 volume series)]. As used herein, in certain aspects "nonequilibrium peracetic acid solutions" refer to PAA solutions having equilibrium constants greater than 10, greater than 100, greater than 1000, and greater than 10,000. Equilibrium solutions of peroxycarboxylic other than peracetic acid are known in the art and equilibrium constants for the generic equilibrium equation:

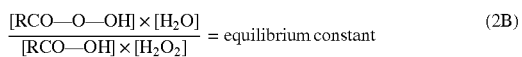

are known in the art or can be determined by methods well-known in the art. An example of typical equilibrium compositions commercially produced and distributed in bulk is 5-35% by weight peracetic acid, up to 30% hydrogen peroxide, up to 40% acetic acid and the balance being water. The weight ratio of hydrogen peroxide to peracetic acid to acetic acid in the merchant products ranges between 4.6:1:1.3 (5-6% PAA equilibrium product) and 1:5.4:6.2 (35% PAA equilibrium product). Using only the $[H_2O_2][PAA]$ ratio is an oversimplified definition for distinguishing equilibrium from non-equilibrium peracetic acid solutions in that it does not represent the acetic acid constituent involved with the equilibrium constant.

"Non-equilibrium" refers to chemical mixtures that do not provide an equilibrium constant value, such as provided by Equation (2A) for peracetic acid solutions, that is between about 1.8 and 2.5 or for Equation (2B) where the specific equilibrium constant depends upon the R group. Accordingly, a non-equilibrium PAA solution is optionally described as having an equilibrium constant typically as calculated by Equation (2) that is not between 1.8 and 2.5. In an aspect, the nonequilibrium PAA is defined as those solutions having an equilibrium constant of greater than 10, greater than 100, greater than 1000, and greater than 10,000.

In specific embodiments, herein the non-equilibrium PAA solutions include those in which the ratio of hydrogen peroxide to PAA is less than 2, those in which this ratio is less than 1 and to those in which this ratio is 0.5 or less. Non-equilibrium PAA solutions of this invention include those in which the concentration of PAA is less than 200 mg/L, those in which this concentration is 100 mg/L or less, those in which the concentration is 50 mg/L or less, those in which the concentration is 10 mg/L or less and those in which the concentration is 5 mg/L or less.

Current practice in cleaning, disinfection and water treatment applications is distribution of bulk PAA solutions delivered and stored in vented drums until use. This is typically sold as equilibrium solutions with PAA concentrations of 5-6%, 15% or 35% in the presence of excess hydrogen peroxide and acetic acid with water making up the balance.

Alternatively, large quantities of equilibrium PAA can be produced on-site by blending concentrated hydrogen peroxide and acetic acid in water. Sulfuric acid may also be added as a catalyst to accelerate the equilibration. The blended solution is allowed to 'cure' for at least 6-10 days while reaching chemical equilibrium prior to use. The cure time increases with decreasing concentration of either starting material and is several weeks or longer at very low point-of-use concentrations. Most applications using peracetic acid (with the exception of pulp bleaching) are regulated to use less than 170 mg/L concentrations for hard surface cleaning and less than 80 mg/L for contact with produce and often less than 10 mg/L for water treatment.

As an example of the drawback to producing low concentration equilibrium solutions, a 200 mg/L concentration of peracetic acid in an equilibrium solution would contain 4000 mg/L hydrogen peroxide and 35,000 mg/L acetic acid that is unused starting material (equilibrium constant=2.05). In contrast, non-equilibrium peracetic acid solutions can contain 200 mg/L peracetic acid, 200 mg/L hydrogen peroxide and 160 mg/L acetic acid (equilibrium constant=9315). Therefore to directly produce low concentrations of peracetic acid rapidly and economically on-site, a non-equilibrium product is required.

Conventional non-equilibrium peracetic acid solutions are commercially produced in bulk by distillation of equilibrium peracetic acid solutions and storing the non-equilibrium distillate near its freezing point to minimize decomposition and re-equilibration during storage. Equilibrium peracetic acid solutions are produced by reacting concentrated hydrogen peroxide with concentrated acetic acid in a 1-20% sulfuric acid solution where the sulfuric acid acts as an acid catalyst to make the reaction occur rapidly. The non-equilibrium peracetic acid produced is distilled from the reaction mixture and stored near its freezing point to minimize decomposition. This method of producing non-equilibrium peracetic acid is not practical for smaller users due to the operating skill required for such a production process, the use of concentrated hazardous materials, and the explosion hazard created by distillation of concentrated peroxides.

Alternatively, non-equilibrium peracetic acid solutions can be chemically produced by an irreversible, non-equilibrium reaction of hydrogen peroxide with an acetyl donor in a solvent such as, but not limited to, water. One typical example of this reaction using acetylsalicylic acid as the acetyl donor is given in Equation (3). Typically caustic pH (pH>10) is used to accelerate the reaction since the hydrogen peroxide anion is a much better nucleophile than hydrogen peroxide. The reaction pH can be adjusted with an appropriate base (proton acceptors such as hydroxide or amines for example).

Both the hydrogen peroxide anion and hydroxide anion compete in the reaction with the acetyl donor, the former producing peracetic acid and the latter producing acetic acid. The percent conversion of the acetyl donor to peracetic acid is maximized by optimizing the hydrogen peroxide to hydroxide ratio mixing method and reaction time. In embodiments, the processes provided herein adjust the hydrogen peroxide to hydroxide ratio, such as ratios of 1:2, 1:1.5, 1:1, 1.5:1, 2:1, greater than 2:1. In the example given below, up to 85% of the acetyl donor is converted to peracetic acid.

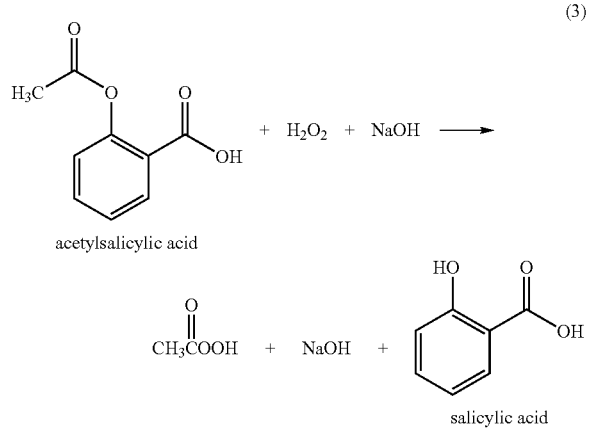

(3)

Both the hydrogen peroxide anion and hydroxide anion compete in the reaction with the acyl donor, the former producing a peroxycarboxylic acid and the latter producing a carboxylic acid. The percent conversion of the acyl donor to peroxycarboxylic acid is maximized by optimizing the hydrogen peroxide to hydroxide ratio, mixing method and reaction time. In embodiments, the processes provided herein adjust the hydrogen peroxide to hydroxide ratio, such as ratios of 1:2, 1:1.5, 1:1, 1.5:1, 2:1, greater than 2:1. In the example given below, up to 85% of the acyl donor, salicylic acid ethyl ester, is converted to a peroxycarboxylic acid and preferably greater than 85% of the acyl donor is converted to peroxycarboxylic acid. In the example given below, the peroxysalicylic acid may be used, for example, as a biocide, an epoxidation agent for alkenes, or a polymerization agent, catalyst or initiator. In the example given below, the acyl donor byproduct is ethanol, which may be used as a co-solvent component or biocidal component of a product solution.

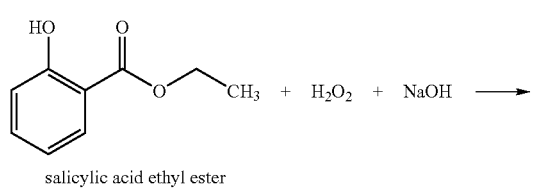

(3.5)

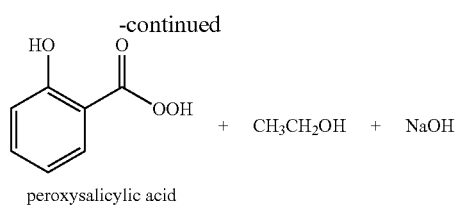

An example of a non-equilibrium reaction solution in the above Equation (3) is combining 1.1 g/L hydrogen peroxide adjusted to pH 12.0 with sodium hydroxide and reacted with 10 g/L acetylsalicylic acid. The product solution contains 0.32 g/L hydrogen peroxide and 1.9 g/L peracetic acid with 85% conversion of the acetylsalicylic acid. This product has a non-equilibrium hydrogen peroxide to peracetic acid ratio of 0.17, more than ten times lower than for merchant equilibrium products.

At alkaline pH (pH>7.5), the peracetic acid is unstable and decomposes to oxygen and acetic acid and/or acetate anion over time at a much higher rate than at lower pH. Alternatively, the acetyl donor byproduct may further react with the peracetic acid in the presence of alkaline pH causing its decomposition or consumption with acetic acid and oxygen as the byproducts. Therefore, the adjustment of the pH to neutral (pH 7) or acidic (pH<7) is often desired for stabilization and storage.

At alkaline pH ($7.5 \leq pH \leq 10.5$), near the pKa of peracetic acid (pKa=8.2), peracetic acid is least stable. Decomposition of peracetic acid is greatly accelerated in this pH range due to a self reaction between the protonated and deprotonated (anion) forms of peracetic acid leading to the evolution of oxygen. The electronic state of oxygen evolved by this mechanism is thought to be singlet oxygen, which is more reactive than triplet oxygen and enhances bleaching and oxidation power. [See Jörg Hoffmann, Gerard Just, Wilhelm Pritzkow, Harald Schmidt, Journal Praktische Chemie/Chemiker-Zeitung, Vol. 334, Iss. 4, pp 293-297 (1992)].

The above self-reaction decomposition process may be inhibited by rapid adjustment of the solution pH from alkaline (pH>10.5) to acidic (pH<7), and the yield of peracetic acid is increased by increasing the rate of pH adjustment.

As disclosed herein, the above self-reaction decomposition process at alkaline pH ($7.5 \leq pH \leq 10.5$) may also be inhibited by addition of an appropriate peroxide stabilizer without adjusting the pH out of this range.

The invention may be further understood by the following non-limiting examples. All references cited herein are hereby incorporated by reference to the extent not inconsistent with the disclosure herewith. Although the description herein contains many specificities, these should not be construed as limiting the scope of the invention, but as merely providing illustrations of some of the presently preferred embodiments of the invention. For example, the scope of the invention should be determined by the appended claims and their equivalents, rather than by the examples given.

Figure 2:
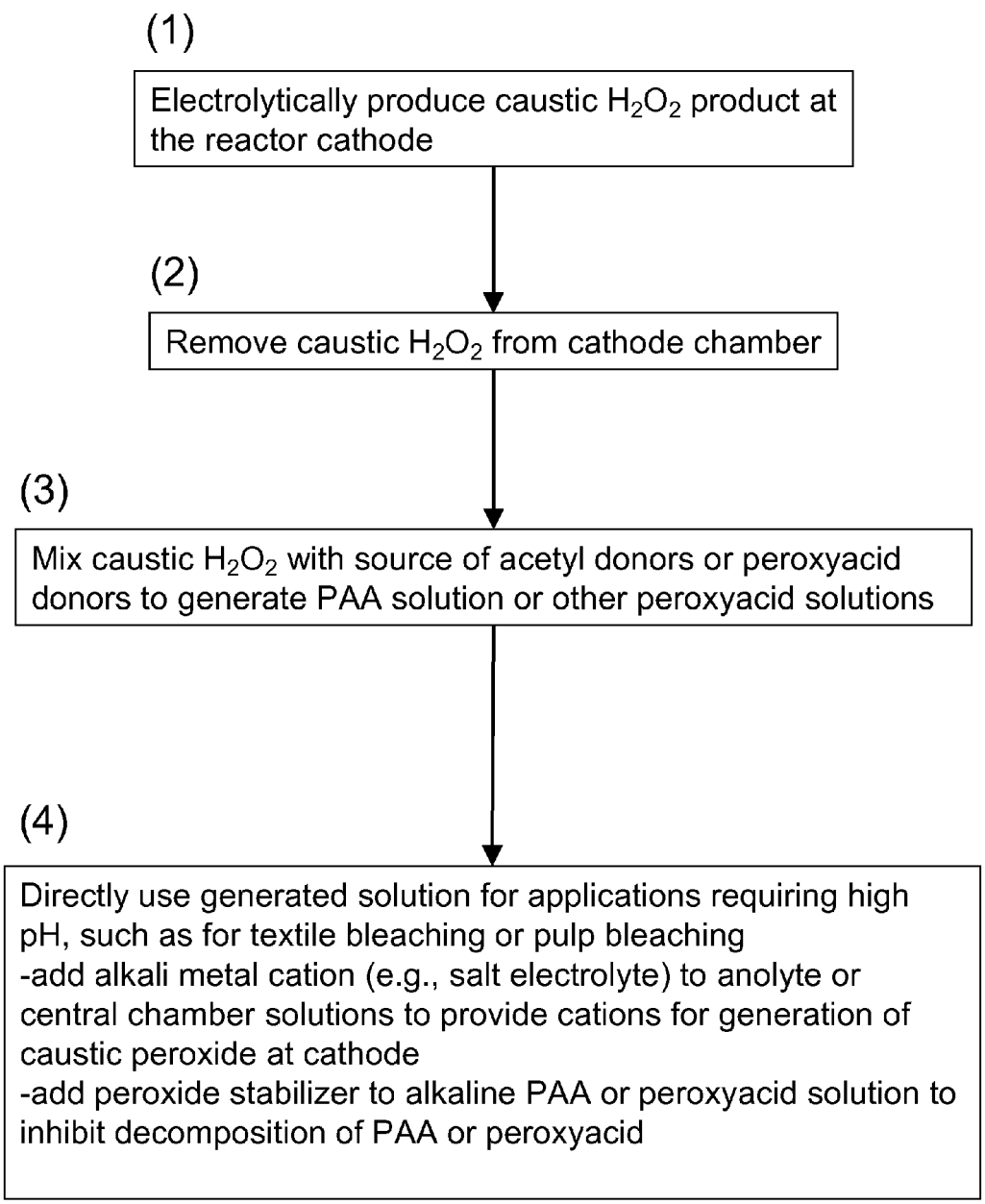
FIG. 2 is a flow-chart summary of one embodiment of a PAA-producing process, where produced PAA is not fed into the reactor, but instead is used directly such as for caustic applications like. A base-containing source or acid-containing source may be used as desired to control the output PAA pH.

Flow-charts of exemplary processes of the invention for production of POA (and PAA) are provided in FIGS. 1-2. In FIG. 1, electrolytically produced caustic $H_2O_2$ is removed from the cathode chamber of electrolysis device and mixed with an acyl or acetyl donor to generate POA solutions. POA composition from the mixing chamber is introduced into a reactor chamber, thereby providing further processing capability. For example, the POA product removed from the reactor can have a precisely user-controlled pH level. The introduction location will depend on the particular reactor, and could range from a central chamber (in a three-chamber system) to an anode chamber (in a two-chamber system), as described herein. Alternatively, FIG. 2 illustrates an embodiment where the POA composition is used "directly."

EXAMPLE 1

Non-Equilibrium PAA Production Using a Three-Chamber Reactor

Figure 3:
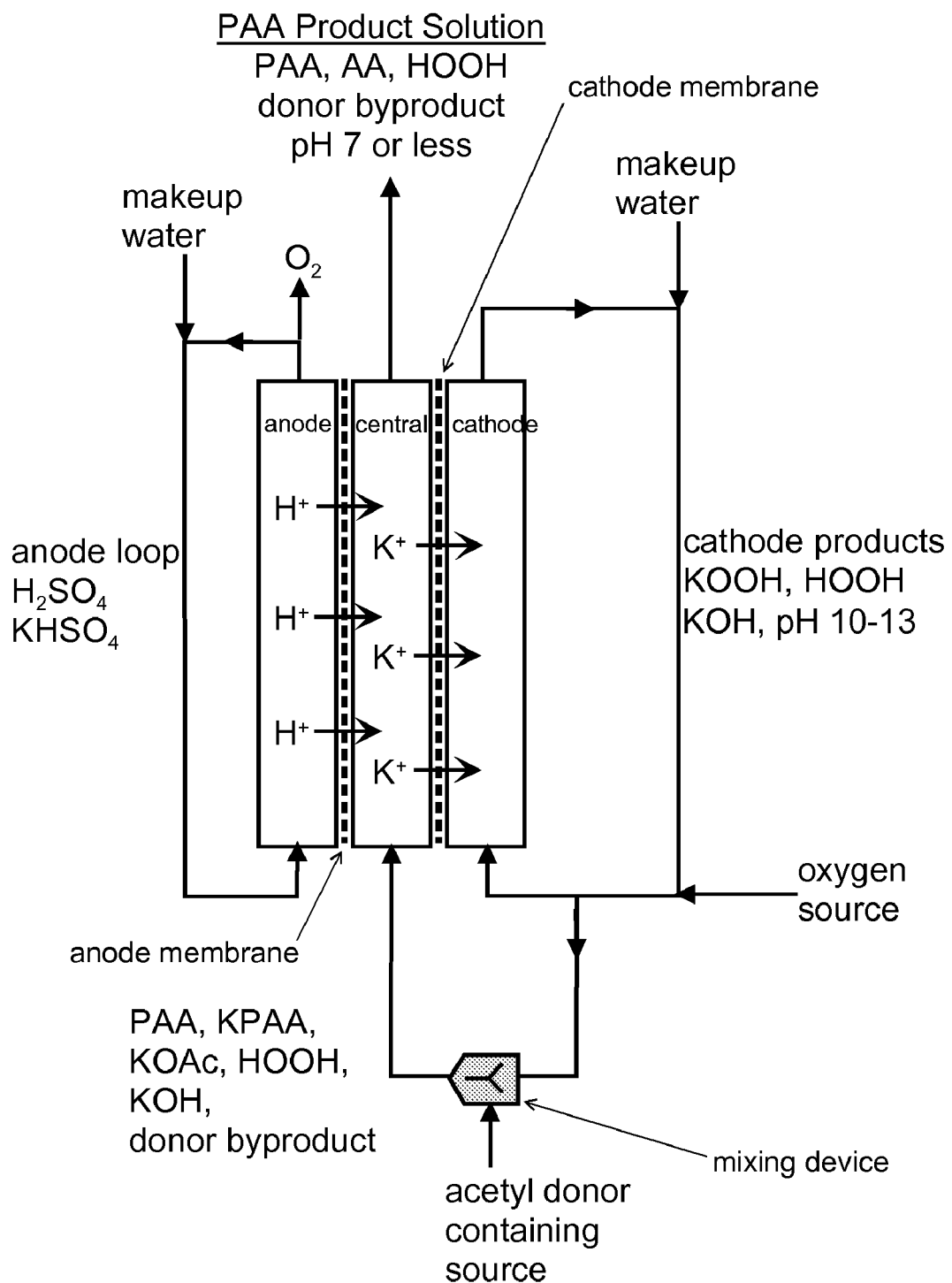
FIG. 3 is a schematic illustration of a three-chamber electrolytic reactor for peracetic acid generation.

FIG. 3 schematically illustrates a process of the invention for generating peracetic acid and other peroxyacids using an electrolytic reactor that generates hydrogen peroxide and caustic (base) from electricity, water, oxygen, electrolyte salts and acetyl donors or peroxyacid donors.

The electrolytic reactor in this example is composed of three flow chambers, one containing an anode (anode chamber), one containing a cathode (cathode chamber) and one disposed in between (central chamber) that does not contain an electrode. The three chambers are separated by cation exchange membranes where the one adjacent to the anode chamber is designated as the anode membrane and the one adjacent to the cathode is the cathode membrane. The anode and cathode electrodes are connected to a power supply (not shown). External to the electrolytic reactor is a mixing device where the caustic hydrogen peroxide solution produced at the cathode is mixed with the acetyl donor containing solution to generate PAA.

The general operating principal of electrolytic reactor is summarized in the following equations (4)-(6). The mixing chamber in the illustrated embodiments is optionally incorporated within the reactor, so long as the chamber interior volume is electrically "isolated" from the cathode and anode chambers. The two electron reduction of oxygen in the presence of water at a cathode surface that supplies electrons to the reaction produces hydroxide and hydrogen peroxide anions. Balancing the electrons consumed and ionic charge generated at the cathode is oxidation of water at the anode, which releases two molar equivalents of electrons and generates ½ molar equivalent of oxygen ($O_2$) and two molar equivalents of protons. To complete the electrolytic process, the protons migrate under the influence of the applied electric field gradient from the anode chamber to the cathode chamber through the cation exchange membranes and solution contained in the central chamber. The protons, upon arrival to the cathode chamber, ion pair with the hydroxide and hydrogen peroxide anions forming water and hydrogen peroxide.

$$\text{cathode reaction: } O_2 + H_2O + 2e^- \rightarrow HOO^- + HO^- \quad (4)$$

$$\text{anode reaction: } H_2O \rightarrow 2H^+ + \tfrac{1}{2}O_2 + 2e^- \quad (5)$$

$$\text{ion pairing: } 2H^+ \text{ (from anode reaction)} + HOO^- + HO^- \rightarrow HOOH + HOH \text{ (in catholyte)} \quad (6)$$

If, on the other hand, the protons migrating from the anode are partially or completely captured and replaced with alkali metal cations (e.g., sodium and/or potassium ions) then the alkali metal cations will instead migrate to the cathode chamber under the influence of the electric field gradient. The alkali metal cations will then ion pair with the hydroxide and hydrogen peroxide anions forming caustic (sodium or potassium hydroxide) and sodium hydrogen peroxide or potassium hydrogen peroxide in the equations (7)-(9) below.

$$\text{cathode reaction: } O_2 + H_2O + 2e^- \rightarrow HOO^- + HO^- \quad (7)$$

$$\text{anode reaction: } H_2O \rightarrow 2H^+ + \tfrac{1}{2}O_2 + 2e^- \quad (8)$$

$$\text{ion pairing (in catholyte): } 2Na^+ \text{ (from anolyte electrolyte or central chamber electrolyte)} + HOO^- + HO^- \rightarrow HOONa + HONa \quad (9)$$

The source of alkali metal cations can be in the form of a salt (sulfate, phosphate, acetate, citrate, bicarbonate, bisulfate etc.) or base (NaOH, KOH, NaOOH, KOOH, etc.) or caustic hydrogen peroxide product from the reactor or caustic peracetic acid product. In a preferred embodiment, the source of alkali metal cations is the caustic peracetic acid product. The alkali metal cation source may comprise in whole or in part the anode solution or central chamber solution. The protons generated at the anode are captured by ion pairing with the above listed anions whereby some or all of the alkali metal cations are liberated and become mobile charge carriers (ionized and mobile in solution and through a membrane) that migrate under the influence of the electric field gradient to the cathode.

In an aspect, any of the systems and methods described herein are further characterized in terms of a molar ratio (also referred herein as a "concentration ratio") of ions in the anolyte solution, and more specifically of the anolyte solution in the anode chamber. In an aspect, the molar ratio of alkali metal ions (e.g., $Na^+$ or $K^+$) to protons (e.g., $H^+$) in the anode chamber is greater than 1, greater than 3, or is greater than 10. As discussed, there are many different means for generating alkali metal ions. An important feature provided herein is preferentially increasing alkali metal ions in the anode chamber to provide a buffer so that amount of available protons is minimized.

In an embodiment for $Na^+/H^+$ Molar ratio (or $K^+/H^+$ Molar ratio) in the anolyte solution for a two chamber reactor configuration and Nafion® as the membrane: The $Na^+/H^+$ ratio should be greater than 1 to have useful alkaline hydrogen peroxide production Faradaic efficiency; preferably the $Na^+/H^+$ ratio is greater than 3 for greater alkaline hydrogen peroxide production efficiency; and ideally this ratio is greater than 10 for the highest alkaline hydrogen peroxide production efficiencies. (There are no efficiency limitations created by the ratio being in greater excess.) The higher the $Na^+/H^+$ ratio, the greater proportion of sodium transport through the membrane over protons to support the production of alkaline hydrogen peroxide.

If so desired, one may reduce this ratio to ca. 3-4 to allow some amount of acid protons to be transported through the membrane from the anolyte to the catholyte. This may be advantageous in some cases to reduce the concentration of hydroxide in the catholyte, thereby increasing the efficiency of the conversion yield of the acetyl donor to the peroxycarboxylic acid when the acetyl donor is mixed with the alkaline hydrogen peroxide solution. The reaction of excess hydroxide with an acetyl donor simply produces the carboxylic acid.

It is understood that these ratios refer to steady-state systems and that there may be a start-up period of time, such as during continuous mode operation where there is a periodic recycling of a reagent such as peroxycarboxylic acid, where steady state has not been achieved and that the ratio is less than 1. In an aspect, the ratios provided herein intend to refer to the ratio achieved during steady state conditions after the start-up period.

By the above mechanism the cations supplied, for example, to the central chamber solution (or alternatively to the anode chamber solution) are transported to the cathode solution under the influence of the electric field gradient. This process is herein referred to as "electrodialysis". By the above mechanism, the alkali metal cations present in a process' cathode solution can be recycled back into an unprocessed cathode solution by passing the processed cathode solution through the central chamber. By the above mechanism, the alkali metal cations present in a processed cathode solution mixed with an acetyl donor to produce peracetic acid may be recycled back into the unprocessed cathode solution by passing the processed cathode solution mixed with an acetyl donor through the central chamber. By the above mechanism, the alkali metal cations present in a cathode solution mixed with a peroxyacid donor to produce a peroxyacid can be recycled back into the cathode solution by passing the cathode solution through the central chamber. A process utilizing one or more of these recycling steps is referred to herein as a "continuous process." A continuous process need not run continuously, but instead refers to this recycling and can be interrupted as needed and supplemented with one or more substituents such as a top-up of water or one or more other reagents. Accordingly, any of the processes or systems described is performed in continuous mode.

When there is more than one type of mobile charge carrier in the system the relative concentrations of each charge carrier type reaching the cathode can be controlled. For example, adjusting the concentration of alkali metal source in the central chamber solution and/or adjusting the type of anion in the central chamber solution will adjust the ratio and/or mobility of protons versus alkali metal cations reaching the cathode chamber. This in turn adjusts the ratio of ion pairing between protons, alkali metal cations, hydroxide, and peroxide anions.

Protons will preferentially ion pair with the stronger base, hydroxide in this case, to form water thereby reducing the hydroxide concentration more rapidly than the peroxide anion concentration (hydrogen peroxide is a weak acid with a $pK_a$ of 11.6). Reducing the hydroxide to peroxide ratio is desirable to maximize the chemical conversion of the acetate or peroxyacid donor to the desired peracetic acid or peroxyacid product instead of the corresponding carboxylic acid. As noted, the hydroxide competes for reaction with the acetyl donor to produce acetic acid.

The process illustrated in FIG. 3 is summarized by the flow-charts of FIG. 1. FIG. 1 reflects an embodiment where: (1) A caustic hydrogen peroxide product is electrolytically produced at the cathode. (2) The caustic hydrogen peroxide product is removed from the reactor and (3) mixed with a source of acetyl donors or peroxyacid donors (single or mixture) and optionally salts and/or peroxide stabilizers to form a solution containing peracetic acid or other peroxyacids. (4) The peracetic acid or peroxyacid containing solution formed in step (3) is then passed back through a different flow chamber in the electrolytic reactor disposed between the anode and cathode flow chambers, partitioned from the cathode and anode flow chambers by ion exchange membranes. During passage of the peracetic acid or peroxyacid containing solution through the central flow chamber of the reactor alkali metal cations are transported by electrodialysis through the cathode membrane and recycled back into the caustic hydrogen peroxide solution production process at the cathode. Alkali metal cations are removed from the peracetic acid or peroxyacid containing solution and are replaced by acid protons produced by electrolytic oxidation of water at the anode and transported through the anode membrane by the applied electric field gradient. This ion transport and electrodialysis process lowers the pH of the peracetic acid or peroxyacid containing solution to a suitable pH range, preferably pH 7 or lower, where peracetic acid and peroxyacids are most stable.

FIG. 2 summarizes another embodiment, where step (4) involving the peracetic acid or peroxyacid containing solution formed in step (3) being used directly for an application requiring elevated pH, such as a pH greater than 11 in some embodiments (example of such an application is pulp bleaching). A salt electrolyte containing alkali metal cations is added to the anolyte or central chamber solutions to provide the cations required by the above process to produce caustic peroxide at the cathode.

There are several useful features related to this example, including: (1) preventing the acetyl donor from contacting an electrode of the reactor where the acetyl donor may be electrolytically degraded or deactivated or the acetyl donor may foul the electrode surface; (1a) preventing the acyl donor from contacting an electrode of the reactor where the acetyl donor may be electrolytically degraded or deactivated or the acyl donor may foul the electrode surface; (2) producing peracetic acid or peroxycarboxylic acids from electrolytically generated hydrogen peroxide and hydrogen peroxide ions from stable precursors, non-toxic precursors, and non-hazardous precursors on-site and on-demand; (3) producing peracetic acid or peroxycarboxylic acids from electrolytically generated hydrogen peroxide and hydrogen peroxide ions in the absence of an electrode so that all peroxide species are preserved in the product stream; (4) producing peracetic acid or peroxycarboxylic acids from electrolytically generated hydrogen peroxide and hydrogen peroxide ions in the absence of a cathode so that all peracetic acid and peroxycarboxylic acids are preserved in the product stream; (5) producing peracetic acid or peroxycarboxylic acids from electrolytically generated hydrogen peroxide and hydrogen peroxide ions in the presence of an anode so that hydrogen peroxide concentration may be decreased in the product stream; (6) producing alkaline electrolyte from a salt rather than adding alkaline chemical feedstocks; (7) controlling the catholyte pH and peroxide to hydroxide ratio by balancing the transfer rates of alkali metal cations and acid protons through the cathode membrane into the catholyte where the cation transfer is driven primarily by electrodialysis; (8) adjusting the pH of the peracetic acid products using electrodialysis to replace alkali metal cations with acid protons generated at the anode; (9) recovering alkali metal cations from the peracetic acid or peroxyacid products using electrodialysis to transfer cations to the catholyte where they are recycled back into the process for producing caustic (alkaline) hydrogen peroxide. An advantage of keeping the acetyl donor and peracetic acid product out of contact with an electrode include avoiding electrolysis of the acetyl donor or PAA product or $H_2O_2$ to inactive forms. Advantages of passing the alkaline PAA product solution through the reactor (central or anode chambers) include automated pH adjustment without the use of bulk chemicals and recovery of alkali metal ions back into the process (minimizes consumables). Advantages of passing the alkaline PAA product through the anode chamber include automated pH adjustment without the use of bulk chemicals; recovery of alkali metal ions back into the process (thereby minimizing the amount of consumables introduced to the reactor); reduction of the $H_2O_2$ concentration (thereby minimizing corrosivity of PAA product); and reduction of the acetyl donor byproduct concentration (thereby reducing organic content).

Additionally, the materials in the reactor system that are contacted by peracetic acid or peroxyacids are preferably compatible and do not cause significant degradation of the peroxyacid products (this includes reactive or catalytic materials, leachable materials, material degradation byproducts, etc.). The materials of the reactor system that are contacted by caustic peracetic acid or peroxyacids products should be compatible and not cause significant degradation of the caustic peroxyacid products (this includes reactive or catalytic materials, leachable materials, material degradation byproducts, etc.). These materials include fluid lines, mixing devices, wetted pump parts, gaskets, membranes, wetted reactor body parts, flow frames, other objects contained within the reactor (screens, fibers, ion exchange resins, particles, etc.) fluid reservoirs, storage tanks, valves, fittings, meters, sensors, etc.

Preferred metals and metal alloys compatible as wetted parts in the reactor system include stainless steel (austenitic alloys), titanium, zirconium, Inconel alloys, Hastelloy alloys. Preferred plastics, elastomers, rubbers and polymers compatible as wetted parts in the reactor system include polypropylene, polysulfone, polyvinylchloride (PVC), chlorinated polyvinylchloride (CPVC), Teflon®, polytetrafluoroethylene (PTFE), polyvinyldifluoride (PVDF, Kynar), Kel-F, polymethyl methacrylate resins (acrylics), acrylonitrile butadiene styrene (ABS) resins, ethylene propylene diene M-class (EPDM), Viton fluoroelastomers (composed of at least two of the following: hexafluoroethylene, vinylidene fluoride, tetrafluoroethylene, and perfluoromethylvinlyethers).

Preferred cathode materials include carbon-based materials such as graphite, carbon fiber, carbon felt, graphite felt, carbon black, activated carbon, carbon aerogels, and carbon nanotubes having native surfaces or surfaces modified with carbon oxides, catalytic organic molecules, catalytic metals and/or metal oxides, halogenated surfaces, thermoplastics (e.g., PTFE), electropolymers (e.g., polypyrrole, polypyridine) and combinations thereof appropriate for the electrochemical reduction of oxygen to peroxide, peroxide ions, and peroxide radicals. In an embodiment preferred cathode materials include metal-based materials such as nickel, stainless steel alloys, Inconel alloys coated with graphite, graphene, carbon black, activated carbon, carbon aerogels, carbon nanotubes, thermoplastics, carbonized thermoplastics, gold, palladium, platinum, iridium and alloys and their respective oxide forms; or specific metal oxides such as oxides of the lanthanides and mixtures of two or more of the metal oxides such as cerium oxide, copper oxide, manganese oxide, iron oxide, silver oxide, nickel oxide, palladium oxide, platinum oxide, iridium oxide.

Preferred anode materials include titanium, anodized titanium supported metal oxides such as iridium oxide, doped iridium oxides, lanthanum oxides and platinized titanium. In a preferred embodiment, the anode is a dimensionally stable anode (DSA) comprising a titanium supported electrocatalyst.

Preferred membrane materials include ion exchange resin membranes and microporous membrane products composed of preferred plastics and polymer resins compatible with the process solutions. In a preferred embodiment the membrane is a Nafion® ion exchange membrane.

Wetted parts of the reactor system are treated prior to generation of peroxide species. All wetted surfaces are washed with a degreasing fluid such as Blue Gold™ or alcohol (e.g., methanol, ethanol, isopropanol) to remove organic materials and soils followed by rinsing with demineralized water. Wetted stainless steel parts are passivated with citric acid or nitric acid at concentrations of at least 5 wt % in warm water heated to at least 35 degrees Centigrade followed by rinsing with demineralized water. Membranes are pre-treated by soaking in alkaline hydrogen peroxide overnight. Any wetted surfaces in contact with peroxycarboxylic acids may also be pre-soaked in alkaline peracetic acid to remove or extract any reactive materials that can react with and consume peroxycarboxylic acid products. Electrodes are prepared according to procedures specific for each particular electrode type and material.

The mixing device for the acetyl donors indicated schematically in FIG. 3 (as well as in FIGS. 4-6) to mix the acetyl or acyl donor materials with the alkaline hydrogen peroxide solution to promote their reaction to produce peroxycarboxylic acids. Several approaches and apparatus may be used to carry out the mixing. Approaches include active mixing, passive mixing, induction, and injection methods. Apparatus effective in this invention include mechanically stirred tanks, centrifugal mixers, centrifugal pumps, static mixers, eductors, venturi mixers, and injector tubes and nozzles. The acetyl or acyl donor may be introduced to such apparatus by means of dosing pumps, metering pumps, peristaltic pumps, gravity feed, solenoid valve feed, rotary valve feed, and pressure driven feed mechanisms utilizing pneumatic or hydraulic driving forces. The mixture of alkaline hydrogen peroxide and acetyl or acyl donor is provided a reaction time (also called residence time or dwell time or cure time) in the mixing apparatus that allows the formation of the peroxyacetic acid product to occur. The reaction time is preferably adjusted to maximize peroxycarboxylic acid yield prior to pH adjustment, stabilization or use. After the selected reaction time, the peroxyacetic acid product is circulated or passed through the central reactor chamber in FIG. 3, (or circulated or passed through the central reactor chamber in FIGS. 4 and 5, or not passed through the reactor in FIG. 6)

An advantage of the acetyl or acyl donor dosing and mixing approach is the ability to use materials in the form of a solid, liquid, dispersion, suspension or combination of such forms. The acetyl or acyl donor may also have limited or minimal solubility in alkaline hydrogen peroxide solution and be mixed as a two-phase system until reaction has occurred. Alternatively, an organic cosolvent may be dosed into the mixture to increase solubility.

Figure 7:
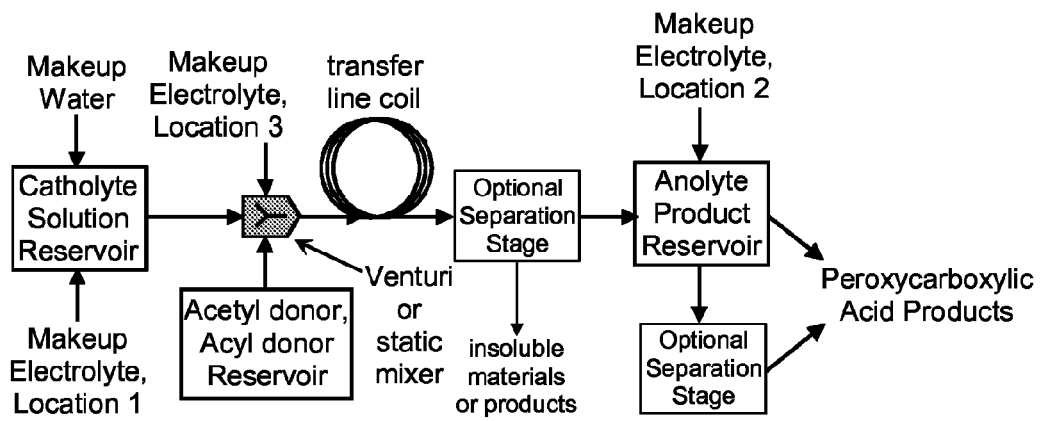
FIG. 7 is a schematic diagram of preferred dosing and mixing of materials in generator process, excluding the electrolytic reactor.

In a preferred embodiment an acetyl or acyl donor in liquid form is injected into an alkaline hydrogen peroxide solution flowing through a venturi mixer followed by a cure time set by the residence time spent traveling through a transfer line of an appropriate length, FIG. 7. The resulting peroxycarboxylic acid solution is transferred to the anode of the reactor to adjust the product pH, recover electrolyte, and lower the residual hydrogen peroxide concentration.

In an embodiment the acetyl or acyl donor is sparingly soluble in alkaline hydrogen peroxide solution resulting in a two phase mixture or dispersion of immiscible liquids. In an embodiment the acetyl or acyl donor dissolution rate is slow in alkaline hydrogen peroxide solution resulting in a two phase mixture, dispersion or suspension.

In an embodiment the peroxycarboxylic acid product is soluble in alkaline hydrogen peroxide solution. In an embodiment the peroxycarboxylic acid product is soluble in acidic solution. In an embodiment the peroxycarboxylic acid product is soluble in water. In an embodiment the peroxycarboxylic acid product is not soluble in the alkaline or acidified product fluid and is recovered as a separate phase by an appropriate means such as precipitation, centrifugation, hydrocyclone separation or filtration.

In an embodiment the acetyl or acyl donor byproduct is soluble in alkaline hydrogen peroxide solution. In an embodiment the acetyl or acyl donor byproduct is soluble in acidic solution. In an embodiment the acetyl or acyl donor byproduct is soluble in water. In an embodiment the acetyl or acyl donor byproduct is sparingly soluble in alkaline hydrogen peroxide solution resulting in a two phase mixture or dispersion of immiscible liquids. In an embodiment the acetyl or acyl donor byproduct is not soluble in the alkaline or acidified product fluid and is recovered as a separate phase by an appropriate means such as precipitation, centrifugation, hydrocyclone separation or filtration.

FIG. 7 indicates three possible locations for makeup electrolyte to enter the generator system. "Makeup Electrolyte Location 1" represents addition of electrolyte into the catholyte solution reservoir either directly or carried in the makeup water. "Makeup Electrolyte Location 2" represents addition of electrolyte into the anolyte solution reservoir or anode circulation loop through the reactor. "Makeup Electrolyte Location 3" represents addition of electrolyte into the mixing stage where the catholyte solution and acetyl or acyl donor materials are mixed. Alternatively, the makeup electrolyte may be combined with the acetyl or acyl donor as a single input into the mixing stage.

The makeup electrolyte may be in the form of a solid, liquid, solution or suspension. Preferred methods of adding solid makeup electrolyte to the generator system include solid chemical feeders such as augers or rotary valve mechanisms. Preferred mechanisms of adding liquid makeup electrolyte (solution, liquid suspension) include chemical feeders such as dosing pumps, peristaltic pumps, gravity, pressure and vacuum.

EXAMPLE 2

Batch Mode Operation

A cathode starting solution consisting of 1.42 g sodium sulfate in 2.0 L of deionized water is added to the catholyte reservoir. An anode solution consisting of 5.56 mL concentrated sulfuric acid in 1.0 L of deionized water is added to the anolyte reservoir. A central chamber solution consisting of 14.2 g sodium sulfate in 1.0 L of deionized water is added to the central chamber reservoir. All three solutions are circulated through their respective flow chambers, as summarized in FIG. 3.

The circulating catholyte solution is oxygenated while a current density of 300 A/m$^2$ is applied to the electrodes for 3 hours using a digital DC power supply operated in current control mode. Hydrogen peroxide and caustic (NaOH) is produced in the catholyte solution giving a cathode product containing 2.04 g/L $H_2O_2$ at pH 11.4 at which time the reactor is turned off. The sodium ion concentration measured in the central chamber solution is depleted from the starting concentration of 4.39 g/L to a final concentration of 1.83 g/L. The catholyte product solution and central chamber solution are drained from the reactor.

2.0 L of catholyte product is mixed in a separate container with 11.69 g of acetylsalicylic acid and 10.65 g sodium acetate trihydrate and this mixture is stirred for 15 minutes. This final mixture is added to the central chamber reservoir. A new catholyte starting solution of 1.42 g sodium sulfate in 2.0 L of deionized is added to the catholyte reservoir.

The reactor is restarted and all three solutions (anolyte, catholyte and central chamber) are circulated through their respective flow chambers. The circulating catholyte solution is oxygenated while a current density of 300 A/m$^2$ is applied to the electrodes for 1 hour. Hydrogen peroxide and caustic (NaOH) is produced in the catholyte solution. The central chamber solution (or peracetic acid product solution) contains 1.3 g/L peracetic acid, and salicylic acid and acetate byproducts at a pH of 4.4. The sodium ion concentration measured in the central chamber solution is depleted from the starting concentration of 2.53 g/L to a final concentration of 1.67 g/L.

In another batch operation example, a cathode starting solution of 1.42 g sodium sulfate in 2.0 L of deionized water is added to the catholyte reservoir. An anode solution of 5.56 mL concentrated sulfuric acid in 1.0 L of deionized water is added to the anolyte reservoir. A central chamber solution of 51.7 g sodium acetate trihydrate in 2.0 L of deionized water is added to the central chamber reservoir. All three solutions are circulated through their respective flow chambers as provided in FIG. 3.

The circulating catholyte solution is oxygenated while a current density of 300 A/m$^2$ was applied to the electrodes for 4 hours using a digital DC power supply operated in current control mode. Hydrogen peroxide and caustic (NaOH) is produced in the catholyte solution giving a cathode product containing 2.86 g/L $H_2O_2$ at pH 12.3 at which time the reactor is turned off. The sodium ion concentration measured in the central chamber solution is depleted from the starting concentration of 4.15 g/L to a final concentration of 1.22 g/L. The catholyte product solution and central chamber solution are drained from the reactor.

2.0 L of catholyte product is mixed in a separate container with 27.50 g of acetylsalicylic acid and 14.40 g sodium acetate trihydrate and this mixture is stirred for 15 minutes. This final mixture is added to the central chamber reservoir. A new catholyte starting solution of 1.42 g sodium sulfate in 2.0 L of deionized is added to the catholyte reservoir.

The reactor is restarted and all three solutions (anolyte, catholyte and central chamber) are circulated through their respective flow chambers. The circulating catholyte solution is oxygenated while a current density of 300 A/m$^2$ is applied to the electrodes for 1 hour. Hydrogen peroxide and caustic (NaOH) is produced in the catholyte solution. The central chamber solution (or peracetic acid product solution) contains 2.7 g/L peracetic acid, less than 0.4 g/L hydrogen peroxide, and salicylic acid and acetate byproducts at a pH of 5.4. The sodium ion concentration measured in the central chamber solution is depleted from the starting concentration of 4.89 g/L to a final concentration of 4.00 g/L.

Continuous mode. In other embodiments the batch production process is modified to work as a continuous production process by drawing off a constant stream of catholyte product directly from the catholyte circulation loop, passing the catholyte product through a mixer (mixing chamber) that is dosed with the acetyl donor, and then passing the mixture through the central chamber with the proper residence time in a single pass. A makeup water stream to the catholyte solution replenishes the catholyte product draw-down volume in the process. This process is illustrated in FIG. 3

Figure 4:
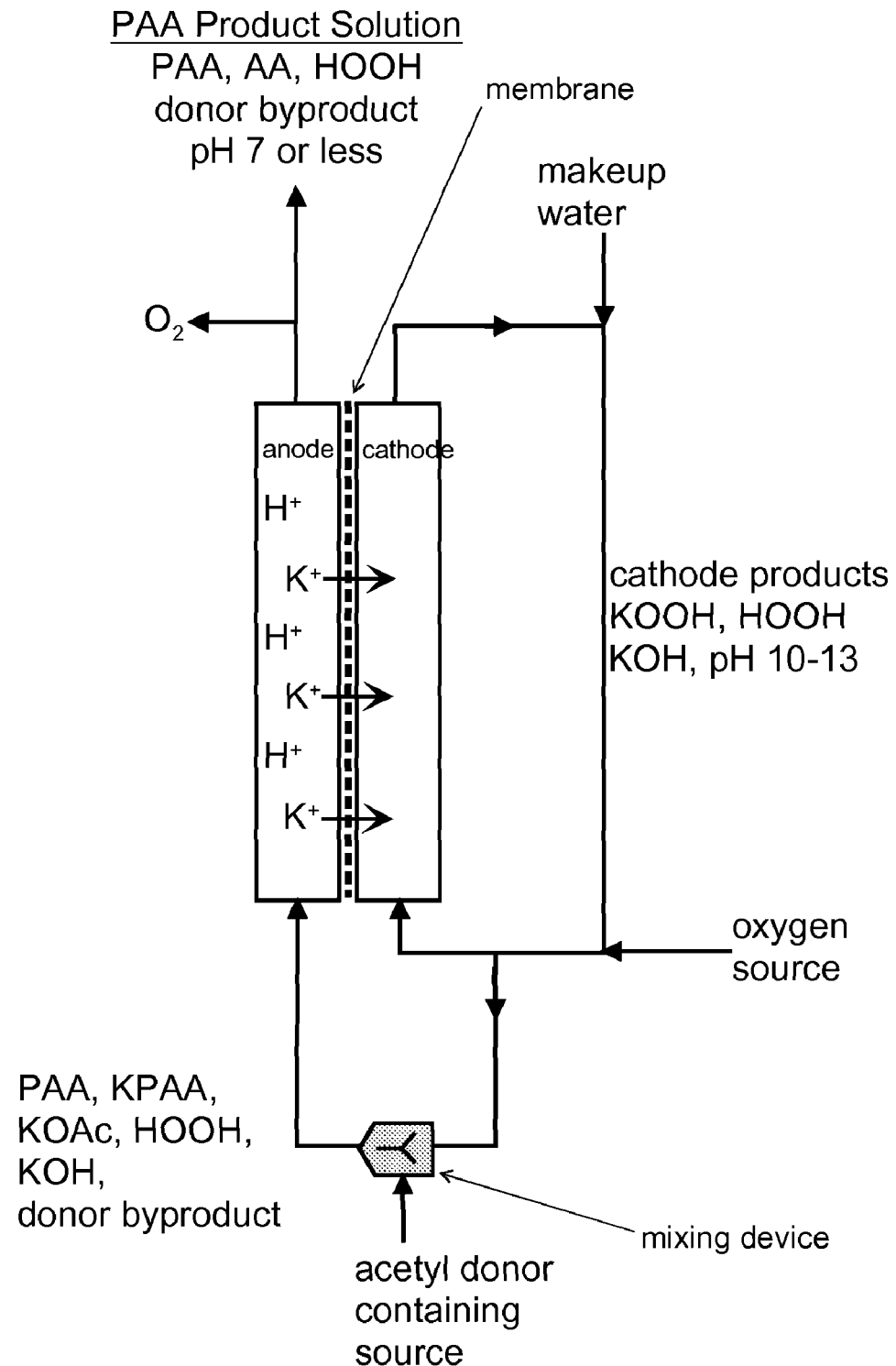
FIG. 4 is a schematic illustration of a two-chamber electrolytic reactor for peracetic acid generation, wherein the generated peracetic acid is passed over the anode as anolyte solution to shift pH from caustic to acid.
Figure 5:
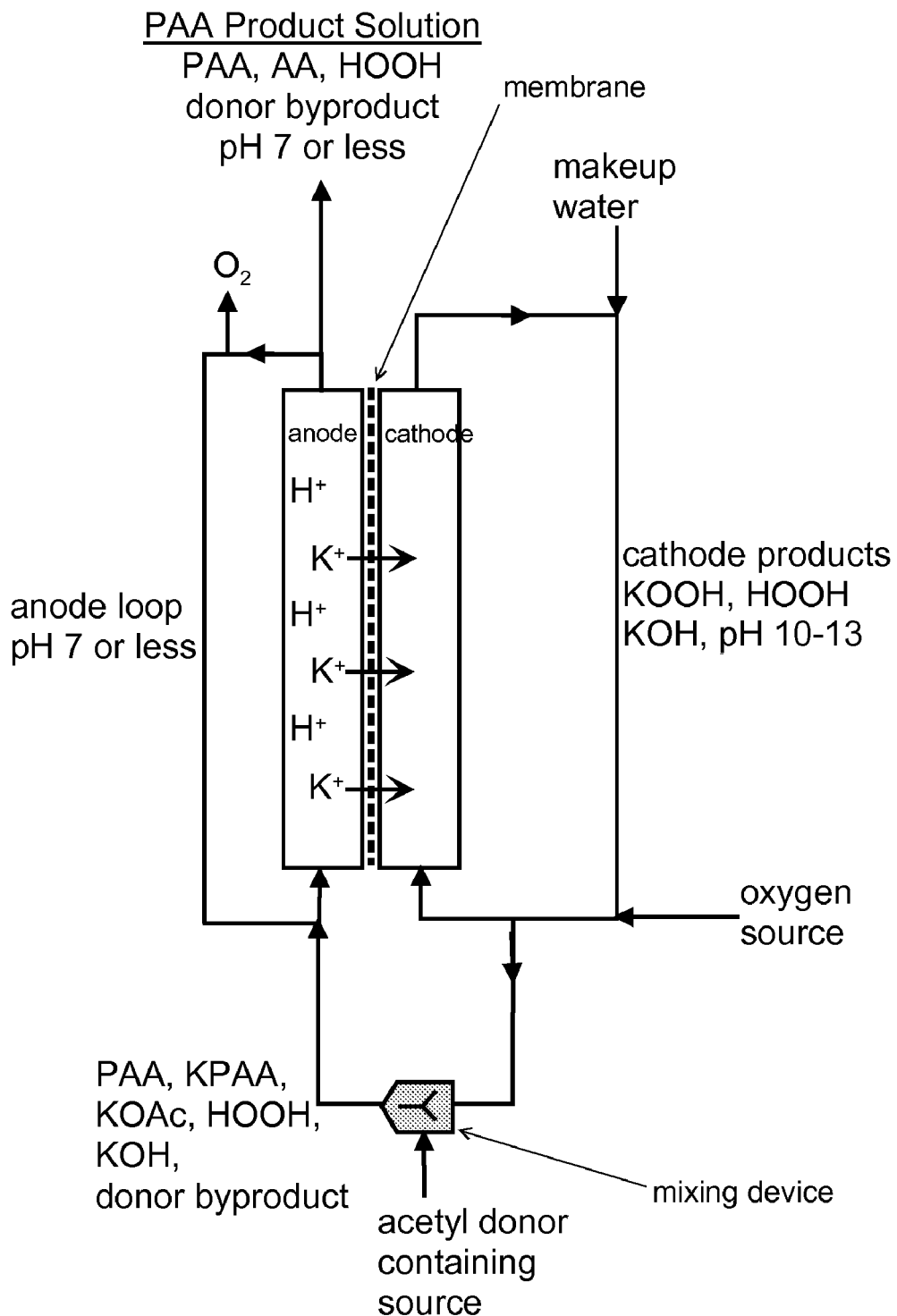
FIG. 5 is a schematic illustration of a two-chamber electrolytic reactor for peracetic acid generation, wherein the generated peracetic acid is dosed into an acidic anolyte loop to rapidly shift the pH from caustic to acid.
Figure 6:
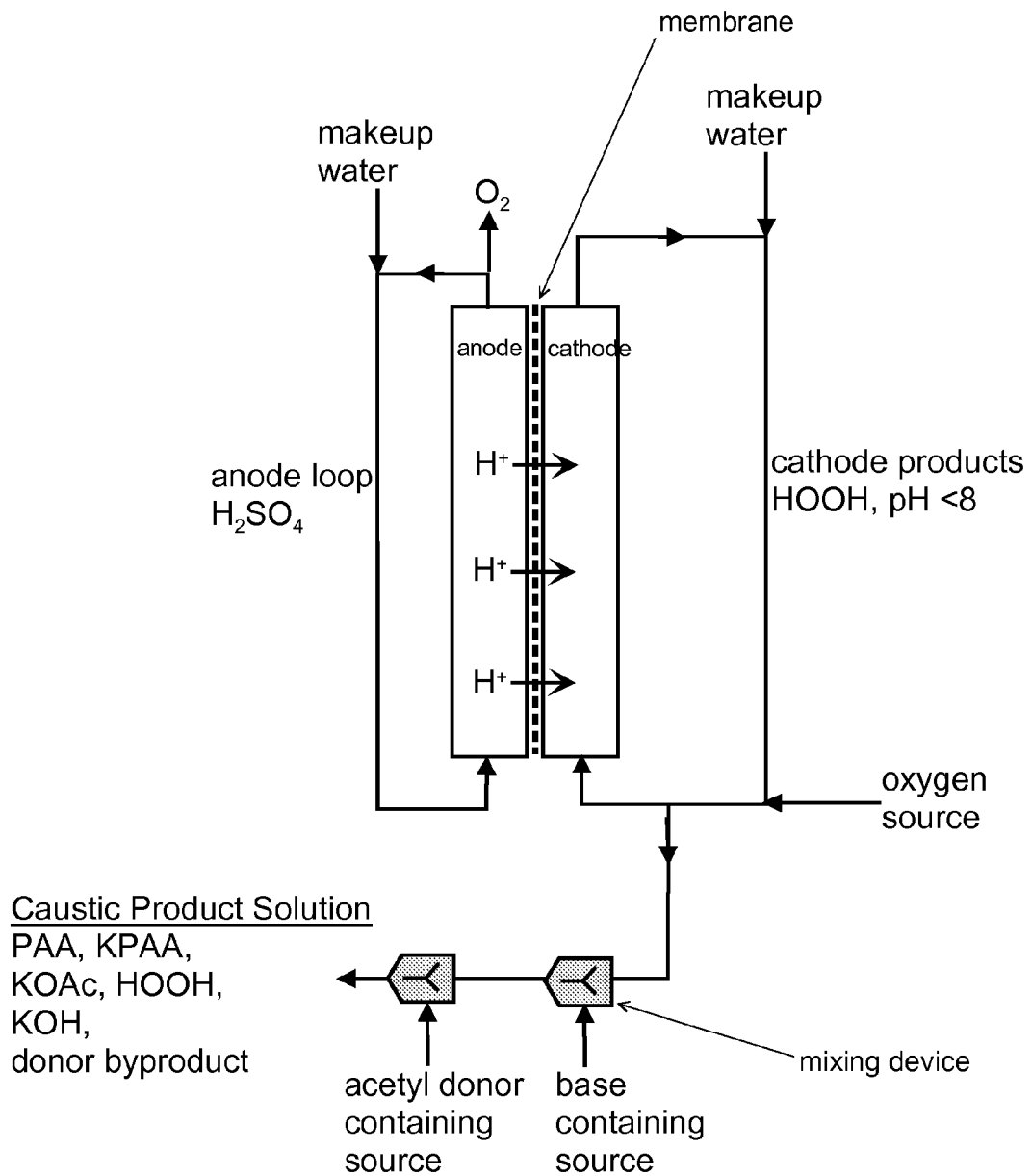
FIG. 6 is a schematic illustration of a two-chamber electrolytic reactor for peracetic acid generation, wherein the generated peracetic acid is directly isolated or used without subsequent interaction with the reactor.

FIGS. 4-6 illustrate various two-chamber embodiments, and are further discussed as Examples 3-5.

EXAMPLE 3

Two-Chamber, pH Shift of PAA Composition

FIG. 4 is a two-chamber configuration, wherein the caustic PAA composition is passed over the anode as anolyte solution to shift the pH from caustic to acid. Sodium and/or potassium cations are recovered back into the cathode process.

EXAMPLE 4

Two-Chamber, Rapid pH Shift by Acidic Anolyte Loop

FIG. 5 is a two-chamber configuration, wherein the caustic PAA product is dosed into an acidic anolyte loop to very rapidly shift the pH from caustic to acid. Cations (such as sodium and/or potassium, for example) are recovered back into the cathode process.

EXAMPLE 5

Two-Chamber, Direct Use of Caustic PAA Composition

FIG. 6 is a two-chamber configuration, wherein the caustic PAA product is used directly. Sodium and/or potassium cations are not recovered back into the cathode process. Sodium or potassium feedstock is added in the form of sodium or potassium hydroxide in the 'base containing source.'

Alternatively, the sodium or potassium feedstock is added as a salt or hydroxide into the anode loop to produce caustic hydrogen peroxide, as in the previous example, to be mixed with the acetyl donor.

The caustic PAA is particularly useful for bleaching in applications such as pulp and paper and textiles.

EXAMPLE 6

Batch Operation, 2-Chamber Reactor Using Triacetin Donor

A cathode starting solution of 1.42 g sodium sulfate in 2.0 L of deionized water is added to the catholyte reservoir. An anode solution of 10.62 mL of 30% peracetic acid and 0.71 g sodium sulfate in 1.0 L of deionized water is adjusted to pH 11.2 with sodium hydroxide and added to the anolyte reservoir. Catholyte and anolyte solutions are circulated through their respective flow chambers.

The circulating catholyte solution is oxygenated while a current density of 300 A/m$^2$ is applied to the electrodes for 4 hours using a digital DC power supply operated in current control mode. Hydrogen peroxide and caustic (NaOH) is produced in the catholyte solution giving a cathode product containing 3.32 g/L H$_2$O$_2$ at pH 11.6 at which time the reactor is turned off. The sodium ion concentration measured in the anolyte solution is depleted from the starting concentration of 3.06 g/L to a final concentration of 0.130 g/L. The anolyte solution is drained from the reactor.

1.0 L of catholyte product is transferred to the empty anolyte reservoir. To this solution is added 3.05 mL of triacetin and this mixture is stirred for 15 minutes. This mixture contained 2.09 g/L peracetic acid and 2.13 g/L hydrogen peroxide and approximately 1.46 g/L sodium ion concentration. 1.0 L of deionized water is added to the remaining catholyte solution in the catholyte reservoir.

The reactor is restarted and the catholyte and anolyte solutions are circulated through their respective flow chambers. The circulating catholyte solution is oxygenated while a current density of 300 A/m$^2$ is applied to the electrodes for 1.5 hours. Hydrogen peroxide and caustic (NaOH) is produced in the catholyte solution. The anolyte solution (or peracetic acid product solution) contains 1.14 g/L peracetic acid and 0.26 g/L hydrogen peroxide at a pH of 3.6. The sodium ion concentration measured in the anolyte product solution is 0.409 g/L.

EXAMPLE 7

Dependence of PAA Decomposition During pH, Temperature Adjustment (3-Chamber Reactor)

For all three exemplary data sets below, PAA solutions are prepared by dissolving the appropriate volume of H$_2$O$_2$ (30%), along with 3.55 g of anhydrous sodium sulfate (0.05M) in 500 mL of deionized water. The pH is adjusted to 11.4 with sodium hydroxide pellets. Triacetin is then added via volumetric pipette. The solution is stirred for 15 minutes and the PAA concentration determined by titration with sodium thiosulfate to give the initial yields shown in Table 1. The pH of the solution is then adjusted by circulation through the central chamber of the electrolytic cell run at 3.0 A. Once the pH turns acidic, a final yield of PAA is determined by titration.

Dependence of PAA decomposition on temperature during pH adjustment (2-Chamber—PAA solutions prepared as above) is summarized in TABLE 2.

High concentration solution of caustic PAA can be diluted before pH adjustment to minimize loss (PAA solutions prepared as above) is summarized in TABLE 3.

Without being bound by any particular theory, there are proposed reasons for loss of PAA yield during pH adjustment. PAA losses during pH adjustment are due to (1) auto-decomposition of the peracetic acid species, which is accelerated at high pH and (2) decomposition by a self reaction between peracetic acid anion and peracetic acid, which is accelerated near the pKa of peracetic acid of 8.2 [Jörg Hoffmann, Gerard Just, Wilhelm Pritzkow, Harald Schmidt, Journal für Praktische Chemie/Chemiker-Zeitung, Vol. 334, Iss. 4, pp 293-297 (1992)]. PAA in the pH range between approximately 7.5 and 10.5 is particularly sensitive to decomposition unless there is a suitable stabilizer present such as salicylic acid or acetylsalicylic acid, phosphonic acid derivatives, Dequest®, 1-hydroxyethylidene-1,1-diphosphonic acid (HEDP), or others. Accordingly, in some embodiments the pH of the cathode products is above about 10.5, thereby minimizing this decomposition affect.

The use of a peroxide stabilizer such as Dequest® provides a stabilizing effect to PAA in the pH range where decomposition is accelerated as summarized in Table 4.

Caustic peroxide solutions are prepared at pH 11.4. Triacetin and Dequest® are added and the solutions stirred for fifteen (15) minutes. The pH is then adjusted with glacial acetic acid and the solutions stirred for an additional sixty (60) minutes.

EXAMPLE 8 pH Adjustment in Anode Chamber of Reactor with the Use of Dequest® Stabilizer An aqueous solution is made containing 6.68 mL H$_2$O$_2$ (30%) and 7.1 g sodium sulfate dissolved in 1 L total volume of deionized H$_2$O. The pH is adjusted to 11.41 with NaOH pellets. 4.0 mL of triacetin is added to this solution along with 0.29 g of Dequest®. The solution is stirred for 10 minutes and the resulting solution contains 2090 ppm PAA at pH 10.6. 500 mL of this PAA solution is circulated through the anode chamber while a cathode starting solution of 1.42 g sodium sulfate in 2.0 L of deionized water is circulated through the cathode chamber. The circulating catholyte solution is oxygenated while a current density of 300 A/m$^2$ is applied to the electrodes. After 30 minutes of electrolysis the anolyte solution contains 1900 ppm PAA at a pH of 4.5. The PAA concentration decreases by 9% during the pH adjustment in the reactor. This loss is in contrast to what is typically near a 30% loss without the use of a stabilizer at comparable PAA concentration as summarized in Tables 1 and Table 3.

EXAMPLE 9

Continuous Operation, 2-Chamber Reactor Using Triacetin Donor

The continuous production system has two stages of operation. The first stage is the startup stage during which the internal process fluids are brought up to steady state operating conditions including pH, electrolyte strength, solution volume, hydrogen peroxide concentration, sodium hydroxide concentration, and peracetic acid concentration. The second stage is the continuous production stage during which peracetic acid product solution is generated at a constant rate, pH and composition.

For the startup stage of system operation, a cathode starting solution of 7.22 g sodium sulfate in 7.0 L of deionized water is added to the catholyte reservoir (FIG. 5). An anode starting solution of 58.5 g sodium sulfate and 67.5 g sodium acetate in 2.0 L of deionized water is added to the anolyte reservoir. Catholyte and anolyte solutions are circulated through their respective flow chambers in the reactor.

The circulating catholyte solution is oxygenated with 1.0 L/min oxygen gas at the cathode feed pressure of ca. 18 psig while a current density of 420-480 A/m$^2$ is applied to the electrodes for using a switch mode DC power supply operated in voltage control mode. Hydrogen peroxide and caustic (NaOH) are produced in the catholyte solution, until the catholyte solution contains 6.0-7.0 g/L H$_2$O$_2$ at approximately pH 11.5.

A catholyte solution makeup water source is turned on at a rate of 20 mL/min. The makeup water source is tap water passed through an ion exchange water softening cartridge prior to entering the catholyte reservoir. Sodium sulfate is added to the catholyte solution at a rate of ca. 0.04 g/min. Simultaneously, a side-stream of the catholyte solution is drawn from the catholyte reservoir at a rate of 20 mL/min into which triacetin is dosed at a rate of 0.16 g/min. The catholyte-triacetin mixture is passed through a coil of Teflon tubing having a residence time of ca. 3 min, after which the mixture flows into the anolyte reservoir. Anolyte solution is drawn from the anolyte reservoir through an overflow tube at a rate of ca. 20 mL/min. After the peracetic acid in the anolyte solution reaches a steady state concentration of 4 g/L the startup stage of system operation is complete.

The continuous production stage of system operation commences by maintaining the steady-state conditions achieved with the operating conditions achieved by the completion of the startup stage. The continuous production stage of system operation produces a non-equilibrium peracetic acid solution drawn at a continuous rate of 20 mL/min from the anolyte reservoir having average active ingredient concentrations of 4.2 g/L peracetic acid and 0.4 g/L hydrogen peroxide.

EXAMPLE 10

Continuous Operation, 2-Chamber Reactor Using Triacetin Donor

For the startup stage of system operation a cathode starting solution of 7.22 g sodium sulfate in 7.0 L of deionized water is added to the catholyte reservoir. An anode starting solution of 1.42 g sodium sulfate and 135.5 g sodium acetate in 2.0 L of deionized water is added to the anolyte reservoir. Catholyte and anolyte solutions are circulated through their respective flow chambers in the reactor.

The circulating catholyte solution is oxygenated with 1.0 L/min oxygen gas at the cathode feed pressure of ca. 18 psig while a current density of 210-220 A/m$^2$ is applied to the electrodes for using a switch mode DC power supply operated in voltage control mode. Hydrogen peroxide and caustic (NaOH) are produced in the catholyte solution, until the catholyte solution contains 2.0-2.2 g/L H$_2$O$_2$ at approximately pH 11.5.

A catholyte solution makeup water source is turned on at a rate of 50 mL/min. The makeup water source is tap water passed through an ion exchange water softening cartridge prior to entering the catholyte reservoir. Sodium sulfate is added to the catholyte solution at a rate of ca. 0.04 g/min. Simultaneously, a side-stream of the catholyte solution is drawn from the catholyte reservoir at a rate of 50 mL/min into which triacetin is dosed at a rate of 0.13 g/min. The catholyte-triacetin mixture is circulated in a small reservoir having a residence time of ca. 20 min, after which the mixture passes through an overflow tube into the anolyte reservoir. Anolyte solution is drawn from the anolyte reservoir through an overflow tube at a rate of ca. 50 mL/min. After the peracetic acid in the anolyte solution reaches a steady state concentration of 0.9 g/L the startup stage of system operation is complete.

The continuous production stage of system operation commences by maintaining the steady-state conditions achieved with the operating conditions achieved by the completion of the startup stage. The continuous production stage of system operation produces a non-equilibrium peracetic acid solution drawn at a continuous rate of 50 mL/min from the anolyte reservoir having average active ingredient concentrations of 0.95 g/L peracetic acid and 0.15 g/L hydrogen peroxide.

Detailed product composition analyses was conducted on two different peracetic acid production runs in the continuous operation, 2-chamber reactor using triacetin donor similar to that described above, see Table 5. Peracetic acid and hydrogen peroxide concentrations were determined by established titration methods. Acetic acid and glycerol concentrations were determined by HPLC, sodium ion concentration was measured with a sodium ISE, and pH was measured with a bench top pH meter.

Figure 8:
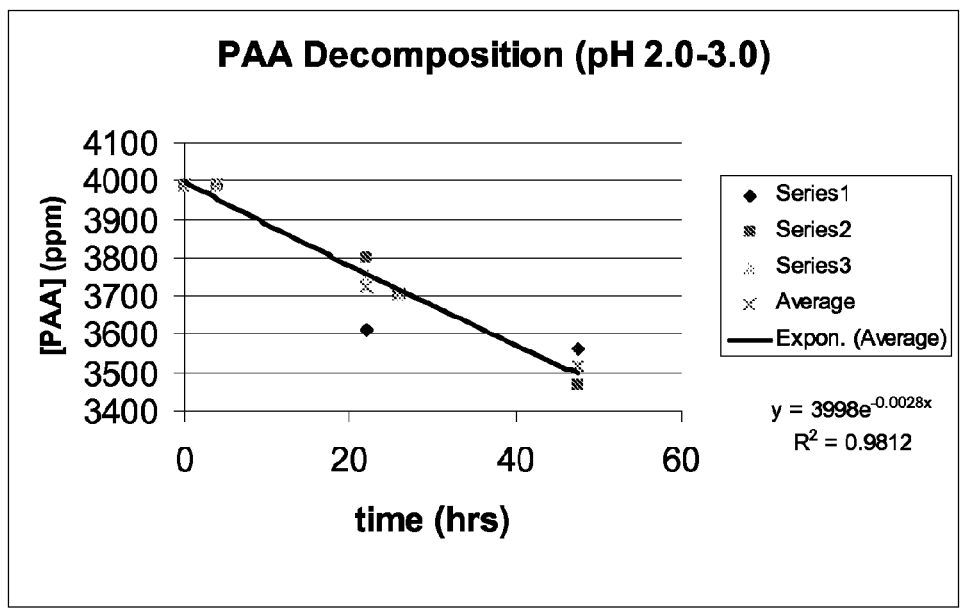
FIG. 8 is a graph of concentration of peracetic acid with time to determine the degradation rate in the absence of peroxide stabilizers. The average half life of the peracetic acid in the product solution was 10 days. The decay curve was approximately linear. See Example 10.
Figure 9:
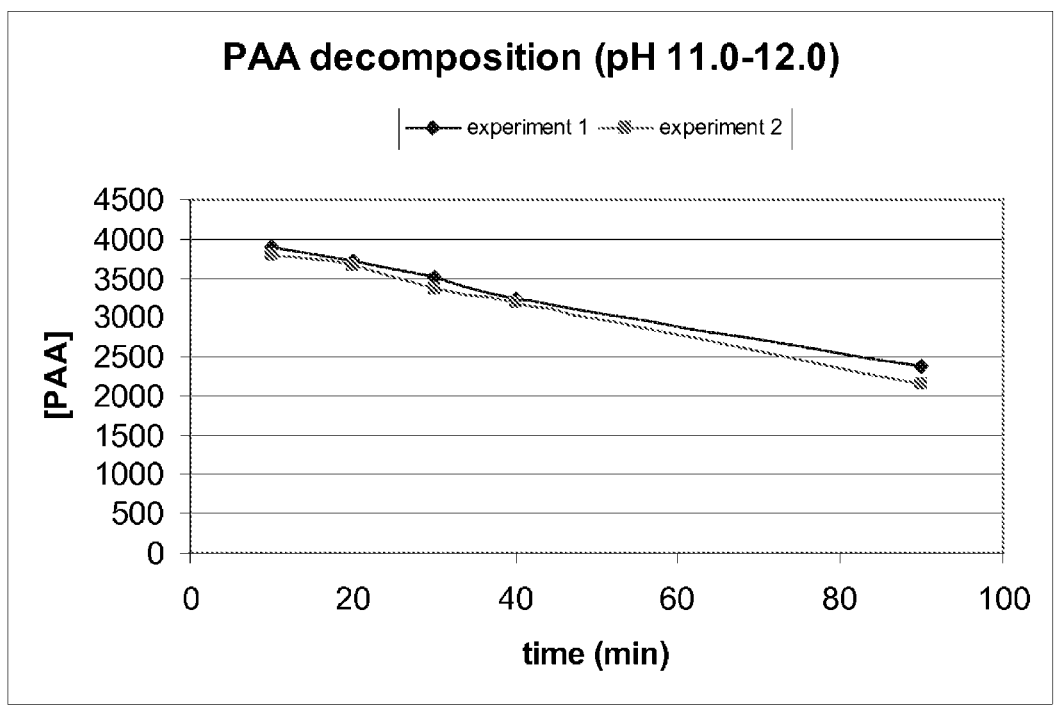
FIG. 9 is a graph of concentration of peracetic acid to determine the degradation rate in the absence of peroxide stabilizers. The average half life of the peracetic acid in the solutions was 1.8 hours. The decay curve was approximately linear as illustrated.

Three peracetic acid product samples collected from the anolyte reservoir of the continuous operation, 2-chamber reactor using triacetin as the acetyl donor were placed in three separate darkened HDPE bottles and stored at room temperature in darkness. At time zero and various times thereafter, the concentration of peracetic acid was measured in each of the three solution samples to determine the degradation rate in the absence of peroxide stabilizers. The average half life of the peracetic acid in the product solution was 10 days. The decay curve was approximately linear as illustrated in FIG. 8.

Two samples of the catholyte-triacetin mixture collected immediately upstream of the anolyte reservoir of the continuous operation, 2-chamber reactor using triacetin as the acetyl donor were placed in two separate darkened HDPE bottles and stored at room temperature in darkness. At time zero and various times thereafter, the concentration of peracetic acid was measured in each of the three solution samples to determine the degradation rate in the absence of peroxide stabilizers. The average half life of the peracetic acid in the solutions was 1.8 hours. The decay curve was approximately linear as illustrated in FIG. 91

EXAMPLE 11

Continuous Operation, 2-Chamber Reactor Using Salicylic Acid Ethyl Ester Donor

For the startup stage of system operation a cathode starting solution of 7.22 g sodium sulfate in 7.0 L of deionized water is added to the catholyte reservoir. An anode starting solution of 120 g sodium sulfate in 2.0 L of deionized water is added to the anolyte reservoir. Catholyte and anolyte solutions are circulated through their respective flow chambers in the reactor.

The circulating catholyte solution is oxygenated with 1.0 L/min oxygen gas at the cathode feed pressure of ca. 18 psig while a current density of 420-480 A/m$^2$ is applied to the electrodes using a switch mode DC power supply operated in voltage control mode. Hydrogen peroxide and caustic (NaOH) is produced in the catholyte solution until the catholyte solution contains 6.0-7.1 g/L H$_2$O$_2$ at approximately pH 11.5. The startup stage of the system is complete when the hydrogen peroxide concentration reaches the desired steady-state concentration.

The continuous production stage of system operation commences by supplying catholyte solution makeup water at a rate of 20 mL/min. The makeup water source is tap water passed through an ion exchange water softening cartridge prior to entering the catholyte reservoir. Sodium sulfate is added to the catholyte solution at a rate of ca. 0.04 g/min. Simultaneously, a side-stream of the catholyte solution is drawn from the catholyte reservoir at a rate of 20 mL/min into which salicylic acid ethyl ester is dosed at a rate of 0.95 g/min. The catholyte-salicylic acid ethyl ester mixture is passed through a coil of Teflon tubing having a residence time of ca. 3 min, after which the mixture flows into the anolyte circulation circuit outfitted with a solids separation apparatus such as a filter, centrifugal separator or settling tank. The acidified persalicylic acid precipitates from solution and is recovered from the anolyte circuit as a solid. Anolyte solution is drawn from the anolyte reservoir through an overflow tube at a rate of ca. 20 mL/min and recycled back into the catholyte makeup water or discharged.

EXAMPLE 12

Continuous Operation, 2-Chamber Reactor Using n-Butylmalonic Acid Diethyl Ester Donor The continuous production system has two stages of operation. The first stage is the startup stage during which the internal process fluids are brought up to steady state operating conditions including pH, electrolyte strength, solution volume, hydrogen peroxide concentration, sodium hydroxide concentration, and peracetic acid concentration. The second stage is the continuous production stage during which peracetic acid product solution is generated at a constant rate, pH and composition.

For the startup stage of system operation a cathode starting solution of 7.22 g sodium sulfate in 7.0 L of deionized water is added to the catholyte reservoir. An anode starting solution of 120 g sodium sulfate in 2.0 L of deionized water is added to the anolyte reservoir. Catholyte and anolyte solutions are circulated through their respective flow chambers in the reactor.

The circulating catholyte solution is oxygenated with 1.0 L/min oxygen gas at the cathode feed pressure of ca. 18 psig while a current density of 420-480 A/m$^2$ is applied to the electrodes for using a switch mode DC power supply operated in voltage control mode. Hydrogen peroxide and caustic (NaOH) is produced in the catholyte solution until the catholyte solution contains 6.0-7.0 g/L H$_2$O$_2$ at approximately pH 11.5.

A catholyte solution makeup water source is turned on at a rate of 20 mL/min. The makeup water source is tap water passed through an ion exchange water softening cartridge prior to entering the catholyte reservoir. Sodium sulfate is added to the catholyte solution at a rate of ca. 0.04 g/min. Simultaneously, a side-stream of the catholyte solution is drawn from the catholyte reservoir at a rate of 20 mL/min into which n-butylmalonic acid diethyl ester is dosed at a rate of 0.62 g/min. The catholyte-triacetin mixture is passed through a coil of Teflon tubing having a residence time of ca. 3 min, after which the mixture flows into the anolyte reservoir. Anolyte solution is drawn from the anolyte reservoir through an overflow tube at a rate of ca. 20 mL/min. After the n-butyl-diperoxymalonic acid in the anolyte solution reaches a steady state concentration of approximately 14.8 g/L the startup stage of system operation is complete.

The continuous production stage of system operation commences by maintaining the steady-state conditions achieved with the operating conditions achieved by the completion of the startup stage. The continuous production stage of system operation produces a non-equilibrium n-butyl-diperoxymalonic acid solution drawn at a continuous rate of 20 mL/min from the anolyte reservoir having average active ingredient concentrations of 14.8 g/L the n-butyl-diperoxymalonic acid, 6.4 g/L n-butylmalonic acid, 13.1 g/L ethanol and 0.4 g/L hydrogen peroxide.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. A number of specific groups of variable definitions have been described herein. It is intended that all combinations and subcombinations of the specific groups of variable definitions are individually included in this disclosure. Compounds described herein may exist in one or more isomeric forms, e.g., structural or optical isomers. When a compound is described herein such that a particular isomer, enantiomer or diastereomer of the compound is not specified, for example, in a formula or in a chemical name, that description is intended to include each isomers and enantiomer (e.g., cis/trans isomers, R/S enantiomers) of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Isotopic variants, including those carrying radioisotopes, may also be useful in diagnostic assays and in therapeutics. Methods for making such isotopic variants are known in the art. Specific names of compounds are intended to be exemplary, as it is known that one of ordinary skill in the art can name the same compounds differently.

Molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every formulation or combination of components described or exemplified herein can be used to practice the invention, unless otherwise stated.

Whenever a range is given in the specification, for example, a temperature range, a time range, a pH range, or a composition or concentration range, all intermediate ranges and subranges, as well as all individual values included in the ranges given are intended to be included in the disclosure. The upper and lower limits of the range may themselves be included in the range. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. The broad term comprising is intended to encompass the narrower consisting essentially of and the even narrower consisting of: Thus, in any recitation herein of a phrase "comprising one or more claim element" (e.g., "comprising A and B), the phrase is intended to encompass the narrower, for example, "consisting essentially of A and B" and "consisting of A and B." Thus, the broader word "comprising" is intended to provide specific support in each use herein for either "consisting essentially of" or "consisting of." The invention illustratively described herein suitably may be practiced in the absence of any element or elements, limitation or limitations which is not specifically disclosed herein.

One of ordinary skill in the art will appreciate that starting materials, catalysts, reagents, synthetic methods, purification methods, analytical methods, and assay methods, other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by examples, preferred embodiments and optional features, modification and variation of the concepts herein disclosed may be resorted to by those skilled in the art, and that such modifications and variations are considered to be within the scope of this invention as defined by the appended claims.

All references cited herein are hereby incorporated by reference to the extent that there is no inconsistency with the disclosure of this specification. Some references provided herein are incorporated by reference to provide details concerning sources of starting materials; alternative starting materials, reagents, methods of synthesis, purification methods, and methods of analysis, reactor systems; as well as additional uses of the invention. For example, U.S. Pub 2007/0074975 (Published Apr. 5, 2007) is hereby specifically incorporated by reference for electrochemical reactors and related methods, including systems and processes for hydrogen peroxide production. Provisional application No. 61/019,825 filed Jan. 8, 2008 is incorporated by reference, and in particular for non-equilibrium compositions of peroxycarboxylic acid and hydrogen peroxide in water, non-equilibrium peracetic acid compositions and processes for producing these non-equilibrium mixtures.

TABLE 1

| Triacetin (mL) | H$_2$O$_2$ (30%) (mL) | Initial caustic PAA Yield (ppm) | PAA Yield after pH adjustment (ppm) | % loss |
|---|---|---|---|---|
| 1 | 1.67 | 760 | 684 | 10 |
| 2 | 3.34 | 1710 | 1330 | 22 |
| 2 | 5.01 | 1900 | 1330 | 30 |

TABLE 2

| Anolyte solution Temp. | Triacetin (mL) | H$_2$O$_2$ (30%) (mL) | Initial caustic PAA Yield (ppm) | PAA Yield after pH adjustment (ppm) | % loss |
|---|---|---|---|---|---|
| >30 C. | 1.25 | 4.58 | 1520 | 950 | 37 |
| ice bath cooled | 1.25 | 4.58 | 1520 | 1330 | 12 |

TABLE 3

| Triacetin (mL) | H$_2$O$_2$ (30%) (mL) | Initial caustic PAA Yield (ppm) | Diluted caustic PAA conc. (ppm) | PAA Yield after pH adjustment (ppm) | % loss |
|---|---|---|---|---|---|
| 3.71 | 13.4 | 5890 | 589 | 475 | 19 |
| 2 | 5.01 | 1900 | not diluted | 1330 | 30 |

TABLE 4

Dequest Stabilization (500 mL) reaction mixtures#

| Triacetin (mL) | H$_2$O$_2$ (30%) (mL) | Dequest ® (g) | Initial Caustic PAA Yield (ppm) | Adjusted pH | PAA concentration after 60 min (ppm) | % loss of PAA |
|---|---|---|---|---|---|---|
| 2.0 | 6.68 | 0 | 3116 | 9.16 | 418 | 86.6 |
| 2.0 | 6.68 | 0.044 | 3268 | 9.42 | 3230 | 1.2 |
| 2.0 | 6.68 | 0.088 | 3230 | 9.36 | 3192 | 1.2 |
| 2.0 | 6.68 | 0.176 | 3344 | 9.59 | 3230 | 3.4 |

TABLE 5

Peracetic acid product composition from continuous 2-chamber reactor using triacetin as feedstock

| Constituent | Trial 1 Concentration | Trial 2 Concentration |
|---|---|---|
| peracetic acid | 950 mg/L | 950 mg/L |
| hydrogen peroxide | 212 mg/L | 170 mg/L |

TABLE 5-continued

Peracetic acid product composition from continuous 2-chamber reactor using triacetin as feedstock

| Constituent | Trial 1 Concentration | Trial 2 Concentration |
|---|---|---|
| acetic acid | 1560 mg/L | 1500 mg/L |
| glycerol | 1120 mg/L | 1110 mg/L |
| sodium | 348 mg/L | NA |
| pH | 3.40 | NA |

We claim:

1. A method for making a peroxycarboxylic acid composition, said method comprising:
   a. electrolytically generating an alkaline solution of hydrogen peroxide or peroxide ions in a reactor comprising a cathode chamber having a cathode, an anode chamber having an anode and at least one cation exchange membrane separating said chambers;
   b. providing a source of alkali metal ions to said anode chamber such that the molar ratio of alkali metal ions to protons formed in the anode chamber is greater than 1 and the predominant cations transported through the at least one cation exchange membrane are alkali metal ions;
   c. reacting said electrolytically generated alkaline solution of hydrogen peroxide or peroxide ions with an acyl donor to form peroxycarboxylic acid in a mixing chamber that is electrically isolated from said anode and cathode of the reactor to produce the peroxycarboxylic acid composition comprising alkali metal ions;
   d. introducing said peroxycarboxylic acid composition from said mixing chamber to said reactor;
   e. adjusting the pH of said peroxycarboxylic acid composition by electrodialysis; and
   c. f. removing said peroxycarboxylic acid composition from said reactor to obtain a peroxycarboxylic acid product solution, wherein the peroxycarboxylic acid composition formed has a pH that is less than or equal to 8.

2. The method of claim 1 wherein the ratio of concentrations of alkali metal ions to protons formed in the anode chamber is greater than or equal to 3.

3. The method of claim 1 wherein the ratio of concentrations of alkali metal ions to protons formed in the anode chamber is greater than or equal to 10.

4. The method of claim 1 wherein the source of alkali metal ions is the peroxycarboxylic acid composition formed in step c wherein at least a portion of said composition is recycled to the anode chamber.

5. The method of claim 1 wherein the source of alkali metal ions is initial addition of an alkali metal salt directly to said anode chamber followed by recycling of at least a portion of the peroxycarboxylic acid composition formed in step c to the anode chamber.

6. The method of claim 1 wherein the reactor further comprises a central chamber between the anode and cathode chambers and separated from each of said chambers by at least one cation exchange membrane and said source of alkali metal ions is added to said anode chamber, said central chamber or both.

7. The method of claim 1 wherein the alkaline solution of hydrogen peroxide or peroxide ions has a pH greater than or equal to 9.

8. The method of claim 1 wherein the pH of the alkaline solution of hydrogen peroxide or peroxide ions ranges from greater than or equal to 10 to less than or equal to 13.

9. The method of claim 1 further comprising introducing a peroxide stabilizer, an electrolyte salt or both into the reactor.

10. The method of claim 1 where the peroxycarboxylic acid is peracetic acid.

11. The method of claim 1 where the peroxycarboxylic acid is a substituted derivative of peroxybenzoic acid.

12. The method of claim 1 wherein said peroxycarboxylic acid is a non-equilibrium composition.

13. The method of claim 1 wherein the pH of the alkaline solution of hydrogen peroxide or peroxide ions ranges from greater than or equal to 9.5 to less than or equal to 13.

14. The method of claim 1 wherein said peroxycarboxylic acid product solution is dosed into an acidic anolyte loop to shift the pH from caustic to acid.

15. A method for making a peroxycarboxylic acid composition, said method comprising:
   a. electrolytically generating an alkaline solution of hydrogen peroxide or peroxide ions in a reactor comprising a cathode chamber having a cathode, an anode chamber having an anode and at least one cation exchange membrane separating said chambers;
   b. providing a source of alkali metal ions to said anode chamber such that the molar ratio of alkali metal ions to protons formed in the anode chamber is greater than 1 and the predominant cations transported through the at least one cation exchange membrane are alkali metal ions;
   c. reacting said electrolytically generated alkaline solution of hydrogen peroxide or peroxide ions with an acyl donor to form peroxycarboxylic acid in a mixing chamber that is electrically isolated from said anode and cathode of the reactor to produce the peroxycarboxylic acid composition comprising alkali metal ions;
   d. introducing said peroxycarboxylic acid composition from said mixing chamber to the anode chamber of said reactor; and
   e. introducing at least a portion of said peroxycarboxylic acid composition from said anode chamber to said mixing chamber by an acidic anolyte loop, thereby providing additional pH regulation of said peroxycarboxylic acid composition.

16. The method of claim 15 wherein the molar ratio of alkali metal ions to protons formed in the anode chamber is greater than or equal to 3.

17. The method of claim 15 wherein the molar ratio of alkali metal ions to protons formed in the anode chamber is between about 3 and 4, inclusive.

18. The method of claim 15 wherein the molar ratio of alkali metal ions to protons formed in the anode chamber is greater than or equal to 10.

19. The method of claim 15 wherein the alkaline solution of hydrogen peroxide or peroxide ions has a pH greater than or equal to 9.

20. The method of claim 15 wherein the peroxycarboxylic acid composition formed has a pH that is less than or equal to 8.

21. The method of claim 15 where the peroxycarboxylic acid is peracetic acid.

22. The method of claim 15 wherein said peroxycarboxylic acid is a non-equilibrium composition.

23. A method for making a peroxycarboxylic acid composition, said method comprising:
   a. electrolytically generating an alkaline solution of hydrogen peroxide or peroxide ions in a reactor comprising a cathode chamber having a cathode, an anode chamber having an anode and at least one cation exchange membrane separating said chambers;

b. providing a source of alkali metal ions to said anode chamber such that the molar ratio of alkali metal ions to protons formed in the anode chamber is greater than 1 and the predominant cations transported through the at least one cation exchange membrane are alkali metal ions; and c. reacting said electrolytically generated alkaline solution of hydrogen peroxide or peroxide ions with an acyl donor to form a peroxycarboxylic acid in a mixing chamber that is electrically isolated from said anode and cathode of the reactor to produce the peroxycarboxylic acid composition comprising alkali metal ions, wherein the reactor further comprises:

a mixing chamber conduit for supplying said electrolytically generated alkaline solution of hydrogen peroxide or peroxide ions to said mixing chamber;

a peroxycarboxylic acid composition conduit for introducing peroxycarboxylic acid composition formed in said mixing chamber to said reactor, wherein said composition conduit is operably connected to said anode chamber; and a reactor outlet for removing from said reactor at least a portion of said peroxycarboxylic acid formed in said reactor.

24. The method of claim 23 wherein said the peroxycarboxylic acid removed from said reactor is in a solution of lower pH than the peroxycarboxylic acid formed in said mixing chamber.

25. The method of claim 24 wherein the reactor further comprises an acidic anolyte loop that operably connects said reactor outlet to said peroxycarboxylic acid composition conduit, providing rapid pH adjustment to the peroxycarboxylic acid formed in said mixing chamber.

* * * * *